United States Patent
Sekiguchi et al.

(10) Patent No.: US 9,229,263 B2
(45) Date of Patent: Jan. 5, 2016

(54) LIQUID CRYSTAL DISPLAY DEVICE

(71) Applicant: FUJIFILM Corporation, Tokyo (JP)

(72) Inventors: Megumi Sekiguchi, Kanagawa (JP);
Shinichi Morishima, Kanagawa (JP);
Takashi Yonemoto, Kanagawa (JP);
Hiroshi Sato, Kanagawa (JP); Taketo Otani, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 204 days.

(21) Appl. No.: 14/133,001

(22) Filed: Dec. 18, 2013

(65) Prior Publication Data
US 2014/0184992 A1    Jul. 3, 2014

(30) Foreign Application Priority Data
Dec. 28, 2012   (JP) .................................. 2012-287974

(51) Int. Cl.
*G02F 1/1335*    (2006.01)

(52) U.S. Cl.
CPC ................................ *G02F 1/133504* (2013.01)

(58) Field of Classification Search
CPC .................... G02F 1/133504; G02F 1/1334
See application file for complete search history.

(56) References Cited

U.S. PATENT DOCUMENTS

| 6,924,870 B1* | 8/2005 | Wang | G02B 5/1833 348/E5.141 |
| 2007/0195233 A1* | 8/2007 | Hasegawa | G02F 1/133504 349/112 |
| 2010/0231830 A1* | 9/2010 | Hirakata | G02B 1/105 349/85 |
| 2012/0188467 A1* | 7/2012 | Escuti | G02B 27/286 349/1 |

FOREIGN PATENT DOCUMENTS

| JP | 2002-090527 A | 3/2002 |
| JP | 2006-133463 A | 5/2006 |

* cited by examiner

*Primary Examiner* — James Dudek
(74) *Attorney, Agent, or Firm* — Jean C. Edwards, Esq.; Edwards Neils PLLC

(57) ABSTRACT

A liquid crystal display device includes first and second polarizers with absorption axes orthogonal to each other; first and second substrates between the first and second polarizers and at least one of which has a transparent electrode; and a twisted-nematic liquid crystal cell disposed between the first and second substrates, wherein a light scattering film is provided at a viewing side of the first and second polarizers and includes a support member and a liquid crystal layer composed of a liquid crystal compound, wherein the pitch of the liquid crystal compound ranges between 0.35 μm and 3 μm and is oriented at 45° relative to a liquid-crystal direction of the liquid crystal display device, wherein the liquid crystal layer has a thickness between 0.17 μm and 10 μm, and wherein a weighted scattering area ratio of a goniophotometer scattering profile of the light scattering film satisfies the following expression.

$$S_{60}/(S_0)^2 \times 1000 > 40$$

$$S_0 = \frac{\sum S_0(\theta) \times \theta}{\sum S_0(\theta)}$$

$$S_{60} = \frac{\sum S_{60}(\theta) \times \exp(-0.2 \times \theta)}{\sum S_{60}(\theta)}$$

20 Claims, 8 Drawing Sheets

LIQUID CRYSTAL DISPLAY DEVICE

CROSS-REFERENCE TO RELATED APPLICATIONS

The present application claims the benefit of priority from Japanese Patent Application No. 287974/2012, filed on Dec. 28, 2012, the content of which is herein incorporated by reference in their entirety.

BACKGROUND OF THE INVENTION

1. Field of the Invention

The present invention relates to liquid crystal display devices. In particular, the present invention relates to a liquid crystal display device with high front contrast and suppressed downward grayscale inversion.

2. Description of Related Art

In liquid crystal display devices in the related art, optical films with various optical characteristics are used for optical compensation. For example, as an optical compensation film for a twisted-nematic (TN) liquid crystal display device, an optical compensation film that has an optically anisotropic layer formed of a liquid crystal composition and that is disposed on a transparent support member formed of a polymer film has been proposed.

One problem in the TN mode is that, when the liquid crystal display device is viewed obliquely from a 45-degree position (normally from below) relative to the liquid-crystal director direction, details in the shadow turn black or grayscale inversion (i.e., inversion of dark and light in the grayscale) occurs at any grayscale level, thus significantly lowering the display quality.

For ensuring a sufficient viewing angle for the liquid crystal display device, there have been studies with regard to providing a light scattering film over the viewing surface of the liquid crystal display device (see Japanese Unexamined Patent Applications, Publication Nos. 2006-133463 and 2002-90527).

BRIEF SUMMARY OF THE INVENTION

However, providing a liquid crystal display device with a light scattering film solves the problem of grayscale inversion when viewed from below (i.e., downward grayscale inversion) but deteriorates the front contrast. An object of the present invention is to solve this problem by providing a liquid crystal display device with suppressed downward grayscale inversion and high front contrast.

As a result of a diligent examination performed by the present inventors in view of the aforementioned problem, a light scattering film having a liquid crystal layer was formed. Specifically, the liquid crystal layer has a thickness ranging between 0.17 μm and 10 μm and has a repeating pattern in which the pitch of the liquid crystal compound ranges between 0.35 μm and 3 μm. Moreover, it was discovered that the aforementioned problem can be solved by making the weighted scattering area ratio of a goniophotometer scattering profile satisfy a specific value. This discovery led to the present invention. Specifically, the aforementioned problem is solved by the solution <1> below, and more preferably, solutions <2> to <9> below.

<1> A liquid crystal display device comprising:
first and second polarizers disposed such that absorption axes thereof are orthogonal to each other;
first and second substrates that are disposed facing each other between the first and second polarizers and at least one of which has a transparent electrode; and
a twisted-nematic liquid crystal cell disposed between the first and second substrates,
wherein a light scattering film is provided at a viewing side of the first and second polarizers and includes a support member and a liquid crystal layer composed of a liquid crystal compound applied over the support member, wherein the liquid crystal layer has a repeating pattern in which the pitch of the liquid crystal compound ranges between 0.35 μm and 3 μm and that is oriented at 45° relative to a liquid-crystal director direction of the liquid crystal display device, wherein the liquid crystal layer has a thickness ranging between 0.17 μm and 10 μm, and wherein a weighted scattering area ratio of a goniophotometer scattering profile of the light scattering film satisfies the following expression:

$$S_{60}/(S_0)^2 \times 1000 > 40$$

where $S_0$ and $S_{60}$ are values defined based on the following expressions:

$$S_0 = \frac{\sum S_0(\theta) \times \theta}{\sum S_0(\theta)}$$

where $S_0(\theta)$ denotes a value obtained by irradiating a film surface of the light scattering film with light in a direction of the normal thereto and measuring a light intensity of scattered light from a polar angle $\theta°$ relative to the direction of the normal to the film surface of the light scattering film, and $$S_{60} = \frac{\sum S_{60}(\theta) \times \exp(-0.2 \times \theta)}{\sum S_{60}(\theta)}$$

where $S_{60}(\theta)$ denotes a value obtained by irradiating the film surface of the light scattering film with light in a 60° direction relative thereto and measuring a light intensity of scattered light from a polar angle $\theta°$ relative to the direction of the normal to the film surface of the light scattering film.

<2> The liquid crystal display device according to <1>, wherein the pitch of the liquid crystal compound ranges between 1.0 μm and 2.5 μm.

<3> The liquid crystal display device according to <1> or <2>, wherein the thickness of the liquid crystal layer ranges between 1.0 μm and 2.5 μm.

<4> The liquid crystal display device according to any one of <1> to <3>, wherein the liquid crystal compound included in the liquid crystal layer is a discotic liquid crystal compound, wherein a director of the discotic liquid crystal compound is tilted at an angle θ ranging between ±30° and ±60°, wherein absolute values of tilt angles are the same, and wherein alignment patterns with different positive and negative angle values repeat in an alternating manner.

<5> The liquid crystal display device according to any one of <1> to <3>, wherein the liquid crystal compound included in the liquid crystal layer is a rod-like liquid crystal compound, and wherein a director of the rod-like liquid crystal compound is oriented within ±10° relative to the direction of the normal to the film surface of the light scattering film.

<6> The liquid crystal display device according to <5>, wherein a hard-coat layer is formed on the surface of the light scattering film.

<7> The liquid crystal display device according to any one of <1> to <6>, wherein the liquid crystal display device is of a birefringent type.

<8> The liquid crystal display device according to any one of <1> to <7>, further comprising polarizer protection films provided at liquid-crystal-cell sides of the first and second polarizers, wherein each protection film has an optically anisotropic layer including a support member and a discotic liquid crystal compound fixed in a hybrid alignment state on the support member.

<9> A light scattering film comprising:
a support member; and
a liquid crystal layer composed of a liquid crystal compound applied over the support member,
wherein the liquid crystal layer has a repeating pattern in which the pitch of the liquid crystal compound ranges between 0.35 μm and 3 μm and that is formed in one direction at a film surface, wherein the liquid crystal layer has a thickness ranging between 0.17 μm and 10 μm, and wherein a weighted scattering area ratio of a goniophotometer scattering profile of the light scattering film satisfies the following expression:

$$S_{60}/(S_0)^2 \times 1000 > 40$$

where $S_0$ and $S_{60}$ are values defined based on the following expressions:

$$S_0 = \frac{\sum S_0(\theta) \times \theta}{\sum S_0(\theta)}$$

where $S_0(\theta)$ denotes a value obtained by irradiating the film surface of the light scattering film with light in a direction of the normal thereto and measuring a light intensity of scattered light from a polar angle θ° relative to the direction of the normal to the film surface of the light scattering film, and $$S_{60} = \frac{\sum S_{60}(\theta) \times \exp(-0.2 \times \theta)}{\sum S_{60}(\theta)}$$

where $S_{60}(\theta)$ denotes a value obtained by irradiating the film surface of the light scattering film with light in a 60° direction relative thereto and measuring a light intensity of scattered light from a polar angle θ° relative to the direction of the normal to the film surface of the light scattering film.

According to the present invention, a liquid crystal display device with suppressed downward grayscale inversion and high front contrast can be provided.

DETAILED DESCRIPTION OF THE INVENTION

Figure 1:
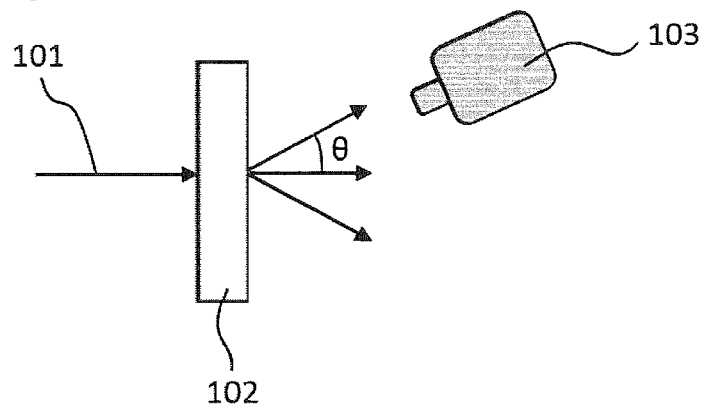
FIG. 1 schematically illustrates a method for measuring $S_0(\theta)$.

In this description, Re(λ) and Rth(λ) are retardation (nm) in plane and retardation (nm) along the thickness direction, respectively, at a wavelength of λ. Re(λ) is measured by applying light having a wavelength of λ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, Rth(λ) of the film is calculated as follows.

Rth(λ) is calculated by KOBRA 21ADH or WR on the basis of the six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (A) and (III):

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (A)$$

$Re(\theta)$ represents a retardation value in the direction inclined by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth = \{(nx+ny)/2 - nz\} \times d \quad (III):$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of $\lambda$ nm applied in the inclined direction; and based on the thus-measured retardation values, the estimated value of the mean refractive index and the inputted film thickness value, $Rth(\lambda)$ of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, $Nz=(nx-nz)/(nx-ny)$ is further calculated.

The term "slow axis" refers to a direction in which the refractive index is at a maximum, and the measurement wavelength of the refractive index is a value in a visible light range ($\lambda$=550 nm), unless otherwise noted.

In this specification, with regard to numerical values and numerical-value ranges indicating the optical characteristics of components of an optical film, a liquid crystal layer, etc., as well as qualitative expressions (for example, expressions such as "equivalent", "equal", etc.), it is to be interpreted that they indicate numerical values, numerical-value ranges, and properties that include generally allowable errors for the liquid crystal display device and the components used therein.

Furthermore, in the description of axes, directions, and crossing angles in this specification, when terms like "parallel", "orthogonal", "0°", "90°", and "45°" are simply used without indicating the ranges, they do not have to be exact but have the meaning of "substantially parallel", "substantially orthogonal", "substantially 0°", "substantially 90°", and "substantially 45°". Some deviations are permissible within ranges in which their purposes are achieved. For example, the terms "parallel" and "0°" indicate that the crossing angle is substantially 0° and ranges between −10° and 10°, preferably between −5° and 5°, and more preferably between −3° and 3°. The terms "orthogonal" and "90°" indicate that the crossing angle is substantially 90° and ranges between 80° and 100°, preferably between 85° and 95°, and more preferably between 87° and 93°. The term "45°" indicates that the crossing angle is substantially 45° and ranges between 35° and 55°, preferably between 40° and 50°, and more preferably between 42° and 48°. Furthermore, with regard to angles, "+" indicates the counterclockwise direction, whereas "−" indicates the clockwise direction.

The liquid crystal display device according to the present invention includes first and second polarizers disposed such that absorption axes thereof are orthogonal to each other; first and second substrates that are disposed facing each other between the first and second polarizers and at least one of which has a transparent electrode; and a twisted-nematic liquid crystal cell disposed between the first and second substrates. The liquid crystal display device has a light scattering film at the viewing side of the first and second polarizers. The light scattering film has a support member and a liquid crystal layer composed of a liquid crystal compound applied over the support member. The liquid crystal layer has a repeating pattern in which the pitch of the liquid crystal compound ranges between 0.35 μm and 3 μm and that is formed so as to be oriented at 45° relative to the liquid-crystal director direction of the liquid crystal display device. The liquid crystal layer has a thickness ranging between 0.17 μm and 10 μm. The weighted scattering area ratio of a goniophotometer scattering profile of the light scattering film satisfies the following expression.

$$S_{60}/(S_0)^2 \times 1000 > 40$$

In the above expression, $S_0$ and $S_{60}$ are values defined based on the following expressions:

$$S_0 = \frac{\sum S_0(\theta) \times \theta}{\sum S_0(\theta)}$$

where $S_0(\theta)$ denotes a value obtained by irradiating the film surface of the light scattering film with light in the direction of the normal thereto and measuring the light intensity of the scattered light from a polar angle $\theta°$ relative to the direction of the normal to the film surface of the light scattering film, and $$S_{60} = \frac{\sum S_{60}(\theta) \times \exp(-0.2 \times \theta)}{\sum S_{60}(\theta)}$$

where $S_{60}(\theta)$ denotes a value obtained by irradiating the film surface of the light scattering film with light in a 60° direction relative thereto and measuring the light intensity of the scattered light from a polar angle θ° relative to the direction of the normal to the film surface of the light scattering film.

FIG. 1 schematically illustrates a method for measuring $S_0(\theta)$. Reference numeral 101 denotes the radiated light, reference numeral 102 denotes the light scattering film, and reference numeral 103 denotes a measuring device. At $S_0(\theta)$, light is radiated in the direction of the normal to the film surface of the light scattering film. The light is scattered by traveling through the light scattering film. $S_0(\theta)$ is a value obtained by measuring the light intensity of the scattered light from a polar angle θ° relative to the direction of the normal to the film surface of the light scattering film.

Figure 2:
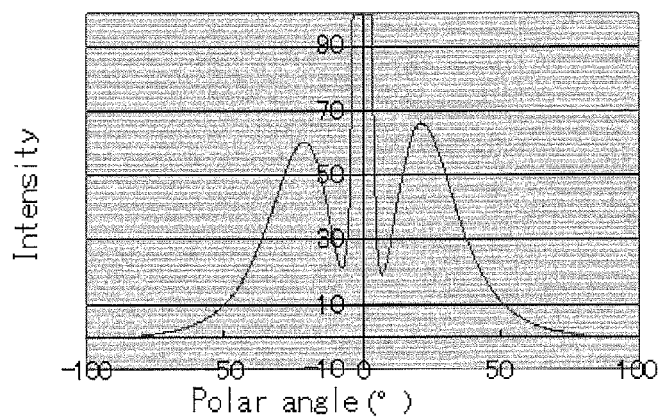
FIG. 2 schematically illustrates the relationship between each angle θ relative to the direction of the normal to a film and an $S_0(\theta)$ value.

FIG. 2 schematically illustrates the relationship between each angle θ relative to the direction of the normal to the film and the value of $S_0(\theta)$. In FIG. 2, the horizontal axis denotes an angle θ (i.e., an angle relative to the direction of the normal to the film) at which the light intensity is measured, whereas the vertical axis denotes the light intensity at that angle.

Figure 3:
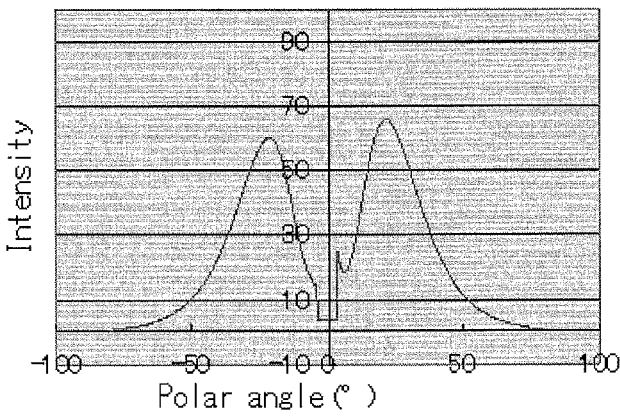
FIG. 3 schematically illustrates a state where a straight-through light component of $S_0(\theta)$ has been removed.

FIG. 3 schematically illustrates a state where a straight-through light component of $S_0(\theta)$ has been removed. The remaining component of the light in FIG. 3 contributes to lower contrast. In other words, the contrast improves as this component decreases.

Figure 4:
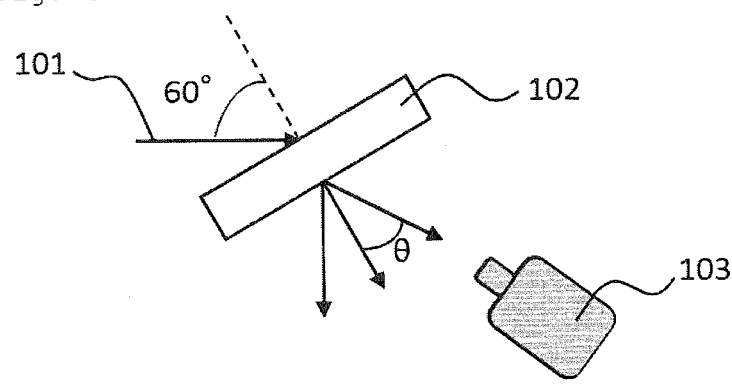
FIG. 4 schematically illustrates a method for measuring $S_{60}(\theta)$.

FIG. 4 schematically illustrates a method for measuring $S_{60}(\theta)$. Reference numeral 101 denotes the radiated light, reference numeral 102 denotes the light scattering film, and reference numeral 103 denotes the measuring device. At $S_{60}(\theta)$, light is radiated in the 60° direction relative to the film surface of the light scattering film. The light is scattered by traveling through the light scattering film. $S_{60}(\theta)$ is a value obtained by measuring the light intensity of the scattered light from a polar angle θ° relative to the direction of the normal to the film surface of the light scattering film.

Figure 5:
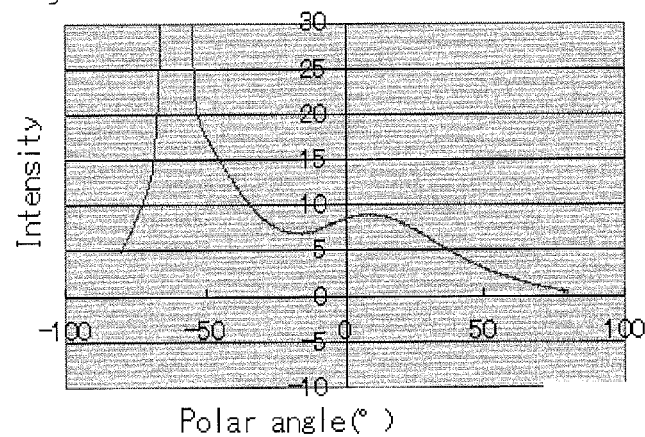
FIG. 5 schematically illustrates the relationship between each angle θ relative to the direction of the normal to the film and an $S_{60}(\theta)$ value.

FIG. 5 schematically illustrates the relationship between each angle θ relative to the direction of the normal to the film and the value of $S_{60}(\theta)$. In FIG. 5, the horizontal axis denotes an angle θ (i.e., an angle relative to the direction of the normal to the film) at which the light intensity is measured, whereas the vertical axis denotes the light intensity at that angle.

Figure 6:
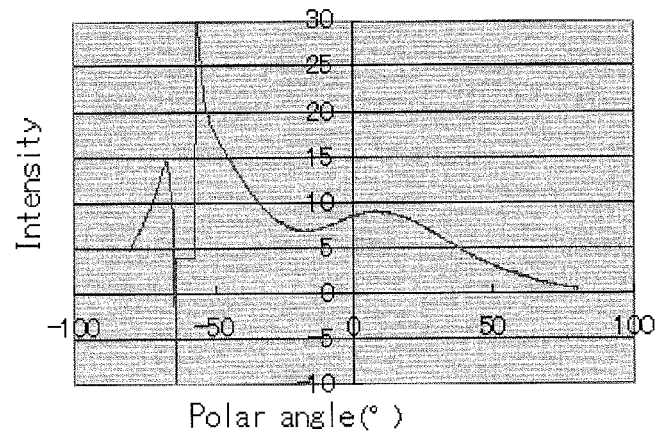
FIG. 6 schematically illustrates a state where a straight-through light component of $S_{60}(\theta)$ has been removed.

FIG. 6 schematically illustrates a state where a straight-through light component of $S_{60}(\theta)$ has been removed. The remaining component of the light in FIG. 6 contributes to suppression of grayscale inversion. In other words, the grayscale inversion decreases as this component increases.

Figure 7:
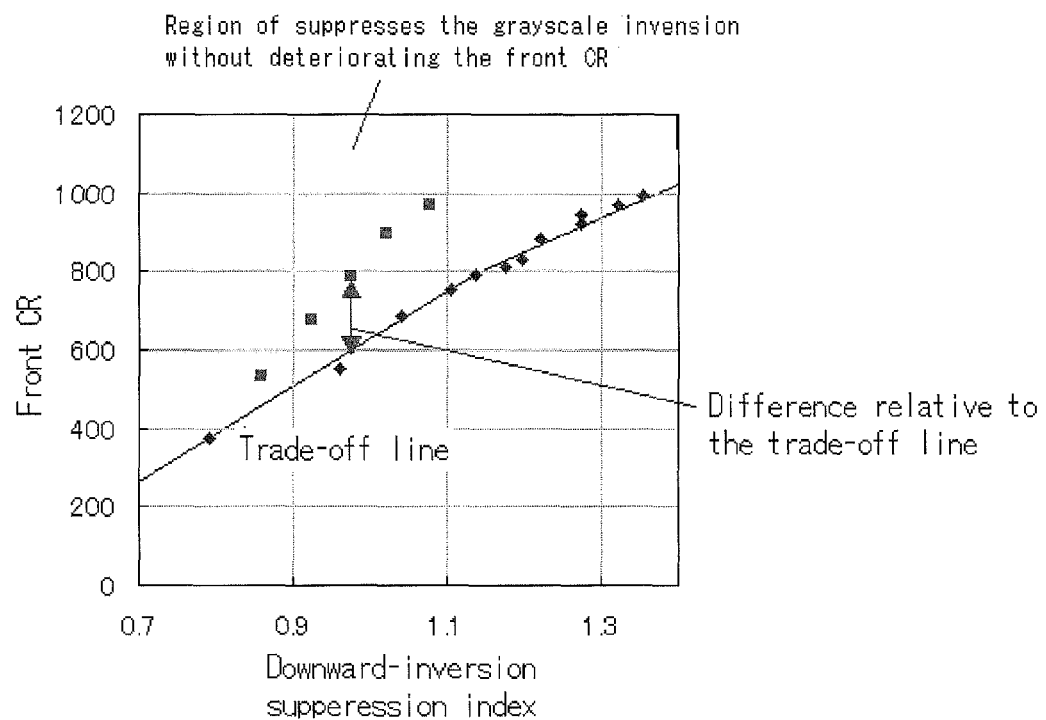
FIG. 7 schematically illustrates the relationship between grayscale inversion and front contrast.

As described above, by giving the film a light scattering function, a downward-grayscale-inversion suppressing component and a front-contrast deterioration component are simultaneously generated. Thus, suppression of grayscale inversion and improvement of front contrast have a trade-off relationship. According to the present invention, indices for adjusting this relationship have been discovered. Specifically, FIG. 7 schematically illustrates the relationship between grayscale inversion and front contrast. In FIG. 7, the horizontal axis denotes a downward-inversion suppression index (i.e., an index that is obtained by performing differentiation once on the front and downward grayscale curves and then performing subtraction and that expresses a difference between the front surface and the gradient), whereas the vertical axis denotes a front-contrast index. In FIG. 7, a trade-off line that suppresses the grayscale inversion without deteriorating the front contrast is drawn with a line corresponding to $S_{60}/(S_0)^2=1$ in a case where the light scattering film has no anisotropy. These are values obtained from experience. If a value is above the trade-off line, the downward grayscale inversion can be suppressed without deteriorating the front contrast. In particular, when the value of $S_{60}/(S_0)^2 \times 1000$ exceeds 40, the front-contrast index improves by 50 or more from the trade-off line. When the value of $S_{60}/(S_0)^2 \times 1000$ is smaller than or equal to 40, the difference relative to the trade-off line is small, meaning that there is not much improvement in the front contrast. Based on this theory, a numerical value that satisfies $S_{60}/(S_0)^2 \times 1000 > 40$ is derived in accordance with the present invention.

The light scattering film that satisfies the above expression has, for example, a support member and a liquid crystal layer composed of a liquid crystal compound applied over the support member. The liquid crystal layer has a repeating pattern in which the pitch of the liquid crystal compound ranges between 0.35 μm and 3 μm. The pattern is formed in one direction toward the screen of the liquid crystal display device, and the liquid crystal layer has a thickness ranging between 0.17 μm and 10 μm. This film is formed by performing adjustment such that a refractive index in the orthogonal direction of the liquid crystal layer, $n_o$, and a refractive index in a diagonal direction (e.g., 60°), $n_e$, are of different values.

[Light Scattering Film]

The liquid crystal display device according to the present invention includes a light scattering film having a support member and a liquid crystal layer composed of a liquid crystal compound applied over the support member. The liquid crystal layer has a repeating pattern in which the pitch of the liquid crystal compound ranges between 0.35 μm and 3 μm. The pattern is formed in at least one direction toward the screen of the liquid crystal display device, and the liquid crystal layer has a thickness ranging between 0.17 μm and 10 μm. With regard to the light scattering film, the weighted scattering area ratio of a goniophotometer scattering profile satisfies the above expression.

The light scattering film is preferably provided at the viewing side of the first and second polarizers.

<Support Member>

The light scattering film has a support member for supporting the liquid crystal layer. The support member is not particularly limited and may be a support member composed of glass or a support member composed of a polymer film. From an economical standpoint, a support member composed of a polymer film is preferred. The support member has a low Re and a low Rth, and preferably has a light transmittance of 80% or higher.

Examples of polymers used for forming the polymer film include a cellulose ester (e.g., cellulose mono-acylate, di-acylate, or tri-acylate), a norbornene-based polymer, and polymethyl methacrylate. A commercially-available polymer (such as ARTON and ZEONEX, both of which are norbornene-based polymers and are registered trademarks) may be used. With regard to polymers that tend to exhibit birefringence, such as conventionally-known polycarbonate and polysulfone, it is preferable to use a polymer in which the appearance of birefringence is controlled by performing molecular modification, as discussed in PCT International Publication No. WO 00/26705 pamphlet.

Among the above examples, a cellulose ester is preferred, and a lower-fatty-acid ester of cellulose is even more preferred. Specifically, preferred examples of cellulose esters may include those discussed in paragraphs [0183] to [0189] in Japanese Unexamined Patent Application, Publication No. 2007-286324.

In order to adjust retardation of a polymer film, a method in which an external force is applied by, for example, stretching is generally used. Alternatively, a retardation increasing agent for adjusting the optical anisotropy is added to the film in some cases. Some examples of compounds used are discussed in EP Patent Application, Publication No. 911656 and Japanese Unexamined Patent Applications, Publication Nos. 2000-111914 and 2000-275434.

The polymer film may contain an additive, depending on various purposes. Examples of additives include a plasticizer such as a sugar ester, a UV inhibitor, a peeling agent, an antistatic agent, a deterioration inhibitor (e.g., an antioxidant, a peroxide decomposer, a radical scavenger, a metal deactivator, an oxygen scavenger, and amine), and an infrared absorbent. The additive may be in a solid state or may be an oily material. If the film is formed of multiple layers, the types and amounts of additives may vary from layer to layer. Specifically, materials discussed in detail on pages 16 to 22 of the Journal of Technical Disclosure No. 2001-1745 are preferably used. With regard to the plasticizer such as a sugar ester, for example, a material discussed in, for example, paragraphs [0022] to [0050] in Japanese Unexamined Patent Application, Publication No. 2012-215812 may be used. With regard to the amounts of additives used, the amount of each material added is not particularly limited so long as its function is achieved. However, it is preferable that the amount of each material added range from 0.001 to 25 percent by mass of all constituents of the polymer film.

Furthermore, the polymer film preferably contains a plasticizer with a number-average molecular weight ranging between 200 and 10,000. Moreover, the plasticizer preferably has negative natural birefringence. Specific examples of plasticizers used are those discussed in paragraphs [0037] to [0075] of Japanese Unexamined Patent Application, Publication No. 2010-253929. The number-average molecular weight can be measured based on a commonly-known method.

<<Method of Manufacturing Polymer Film (Support Member)>>

The polymer film is preferably manufactured based on a solution casting method. Specifically, for example, a method discussed in paragraphs [0059] to [0064] in Japanese Unexamined Patent Application, Publication No. 2008-139368 can be used.

Furthermore, the polymer film according to the present invention may be stretched, subjected to heat treatment, etc. so that the desired optical characteristics can be achieved. Specifically, for example, a method discussed in paragraphs [0131] to [0166] in Japanese Unexamined Patent Application, Publication No. 2010-253929 can be used.

<Liquid Crystal Layer>

The light scattering film has a liquid crystal layer composed of a liquid crystal compound applied over the support member. The liquid crystal layer has a repeating pattern in which the pitch of the liquid crystal compound ranges between 0.35 μm and 3 μm. The pattern is formed in at least one direction toward the screen of the liquid crystal display device. Specifically, the pattern is formed so as to be oriented at 45° relative to the liquid-crystal director direction of the liquid crystal display device. The liquid crystal layer has a thickness t ranging between 0.17 μm and 10 μm.

The pitch p of the liquid crystal compound ranges between 0.35 μm and 3 μm, preferably between 1.0 μm and 2.5 μm, and more preferably between 1.5 μm and 2.5 μm.

When the pitch of the liquid crystal compound is larger than or equal to 0.35 μm, downward grayscale inversion is suppressed effectively. When the pitch is smaller than or equal to 3 μm, deterioration of the front contrast can be suppressed.

The thickness t of the liquid crystal layer ranges between 0.17 μm and 10 μm, and preferably between 1.0 μm and 2.5 μm.

When the thickness of the liquid crystal layer is larger than or equal to 0.17 μm, downward grayscale inversion is advantageously suppressed. When the thickness is smaller than or equal to 2.5 μm, deterioration of the front contrast can be suppressed.

The refractive index $n_o$ of the liquid crystal compound preferably ranges between 1.4 and 1.7, and more preferably between 1.45 and 1.65. The refractive index $n_e$ preferably ranges between 1.4 and 1.7, and more preferably between 1.5 and 1.65.

A difference (refractive-index difference) between the refractive index $n_e$ and the refractive index $n_o$ is preferably 0.045 or larger, and more preferably 0.05 or larger.

The liquid crystal compound applied over the support member can be generally categorized into a rod-like liquid crystal compound and a discotic liquid crystal compound based on its shape. Moreover, there are low-molecular and high-molecular types. In a high-molecular type, the degree of polymerization is generally 100 or higher (Tsuchiya, Masao, "Koubunshi-Butsuri Soutenni-Dainamikkusu", Iwanami Shoten, page 2, 1992). In the present invention, a liquid crystal compound of either type can be used.

The following description relates to a first embodiment of the liquid crystal layer in which a discotic liquid crystal compound is used, and also relates to a second embodiment of the liquid crystal layer in which a rod-like liquid crystal compound is used. The rod-like liquid crystal compound may be referred to as "RLC", and the discotic liquid crystal compound may be referred to as "DLC".

<<Liquid Crystal Layer According to First Embodiment>>

In the liquid crystal layer according to the first embodiment, a discotic liquid crystal compound is used as the liquid crystal compound.

Examples of the discotic (discoidal) compound include benzene derivatives reported by C. Destrade et al. in Mol. Cryst., vol. 71, p. 111 (1981); truxene derivatives reported by C. Destrade et al. in Mol. Cryst., vol. 122, p. 141 (1985) and in Physics Lett. A, vol. 78, p. 82 (1990); cyclohexane derivatives reported by B. Kohne et al. in Angew. Chem., vol. 96, p. 70 (1984); and azacrown and phenylacetylene macrocycles reported by J. M. Lehn et al. in J. Chem. Commun., p. 1794 (1985) and by J. Zhang et al. in J. Am. Chem. Soc., vol. 116, p. 2655 (1994).

It is also preferred the liquid crystal compound have two or more reactive groups having different polymerization characteristics. In this case, a retardation layer containing a polymer having unreacted reactive groups can be produced through selective polymerization of the different reactive groups under controlled conditions. The difference in polymerization conditions may be a difference in wavelength region of ionizing radiation for polymerization immobilization or a difference in polymerization mechanism, but is preferably a difference in combination of a radical reactive group and a cationic reactive group, which is controllable by the type of a polymerization initiator. A combination of a radical reactive group of an acrylic and/or methacrylic group and a cationic reactive group of a vinyl ether, oxetane, and/or epoxy group facilitates the control of the reactivity and is therefore particularly preferred.

Discotic Liquid Crystal Compound Having Polymerizable Group:

The discotic liquid crystal which can be used in the present invention as a main ingredient of the optically anisotropic layer is preferably selected from the compounds having a polymerizable group as describe above.

The discotic liquid crystal is preferably selected from the compounds represented by formula (I).

In the formula, D represents a disc-like core; L represents a divalent linking group; E represents a divalent aromatic ring or a heterocyclic ring; Q is a group containing a polymerizable group; and n is an integer of from 3 to 12.

The disc-like core (D) is preferably a benzene ring, naphthalene ring, triphenylene ring, anthraquinone ring, truxene ring, pyridine ring, pyrimidine ring, or triazine ring, or especially preferably a benzene ring, triphenylene ring, pyridine ring, pyrimidine ring or triazine ring.

L is preferably selected from the divalent liking group consisting of *-O—CO—, *-CO—O—, *-CH=CH—, *-C≡C— and any combinations thereof, or is especially preferably a divalent linking group containing at least one of *-CH=CH— and *-C≡C—. The symbol of "*" is a site bonding to D of the formula (I).

The aromatic ring represented by E is preferably a benzene ring or a naphthalene ring, or is more preferably a benzene ring. The heterocyclic ring represented by H is preferably a pyridine ring or pyrimidine ring, or is more preferably a pyridine ring. Preferably, E is an aromatic ring.

The polymerization of the polymerizable group in the group Q is an addition polymerization (including ring-opening polymerization) or a condensation polymerization. In other words, the polymerizable group is preferably a functional group capable of addition polymerization or condensation polymerization. Among them, a (meth)acrylate or epoxy group is preferable.

Q may contain the linking group connecting H with the polymerizable group, and examples of the linking group include *-O—CO—, *-CO—O—, *-CH=CH—, *-C≡C—, a $C_{1-20}$ alkylene (one carbon atom or two or more carbon atoms not adjacent to each other may be replaced with an oxygen atom) and any combinations thereof.

The discotic liquid crystal represented by the formula (I) is preferably selected from the formula (II).

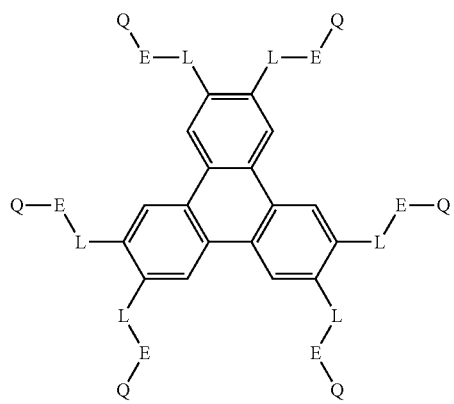

In the formula, the definitions of L, E and Q are same as those of L, E and Q in the formula (I) respectively; and the preferable examples thereof are same as those of L, E and Q in the formula (I) respectively.

As described later, the discotic liquid crystal having plural aromatic rings such as the compounds represented by formula (I), (II) or (IV) may interact with the onium salt such as pyridium or imidazolium compound to be used as an alignment controlling agent by the π-π molecular interaction, thereby to achieve the vertical alignment. Especially, for example, the compound represented by the formula (II) in which L represents a divalent linking group containing at least one selected from *-CH=CH— and *-C≡C—, or the compound represented by formula (IV) in which plural aromatic rings or heterocyclic rings are connected via a single bond to each other may keep the linearity of the molecule thereof since the free rotation of the bonding may be restricted strongly by the linking group. Therefore, the liquid crystallinity of the compound may be improved and the compound may achieve the more stable vertical alignment by the stronger intermolecular π-π interaction.

The discotic liquid crystal is preferably selected from the compounds represented by formula (IV)

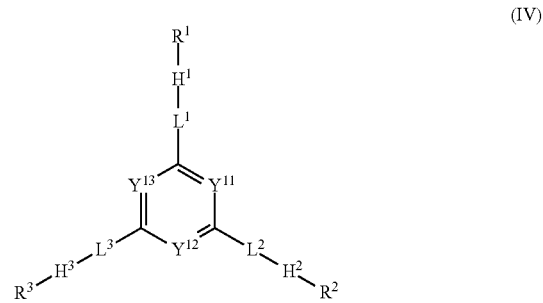

In the formula, $Y^{11}$, $Y^{12}$ and $Y^{13}$ each independently represent a methine group or a nitrogen atom; $L^1$, $L^2$ and $L^3$ each independently represent a single bond or a bivalent linking group; $H^1$, $H^2$ and $H^3$ each independently represent the following formula (I-A) or (I-B); $R^1$, $R^2$ and $R^3$ each independently represent the following formula (I-R).

In formula (I-A), $YA^1$ and $YA^2$ each independently represent a methine group or a nitrogen atom;

XA represents an oxygen atom, a sulfur atom, a methylene group or an imino group;

* indicates the position at which the formula bonds to any of $L^1$ to $L^3$; and

** indicates the position at which the formula bonds to any of $R^1$ to $R^3$.

In formula (I-B), $YB^1$ and $YB^2$ each independently represent a methine group or a nitrogen atom;

XB represents an oxygen atom, a sulfur atom, a methylene group or an imino group;

* indicates the position at which the formula bonds to any of $L^1$ to $L^3$; and

** indicates the position at which the formula bonds to any of $R^1$ to $R^3$.

$$*\text{-}(\text{-}L^{21}\text{-}Q^2)_{n1}\text{-}L^{22}\text{-}L^{23}\text{-}Q^1 \qquad \text{(I-R)}$$

In the Formula (I-R), * denotes a position to be bonded to each of $H^1$ to $H^3$ in the Formula (IV); $L^{21}$ denotes a single bond or a bivalent linking group; $Q^2$ denotes a bivalent group (cyclic group) having at least one kind of cyclic structure; n1 denotes an integer ranging between 0 and 4; $L^{22}$ denotes -O—, -O—CO—, -CO—O—, -O—CO—O—, -S—, -NH—, -SO$_2$—, -CH$_2$—, -CH=CH—, or -C≡C—; $L^{23}$ denotes a bivalent linking group selected from the group consisting of —O—, —S—, —C(=O)—, —SO$_2$—, —NH—, —CH$_2$—, —CH=CH—, —C≡C—, and a combination of these; and $Q^1$ denotes a polymerizable group or a hydrogen atom.

Preferred ranges for the reference characters of the trisubstituted-benzene-based discotic liquid crystal compound expressed by the aforementioned expression (IV) and a specific example of the compound in the aforementioned expression (IV) may be determined by referring to paragraphs [0013] to [0077] in Japanese Unexamined Patent Application, Publication No. 2010-244038. However, the discotic liquid crystal compound that can be used in the present invention is not limited to the trisubstituted-benzene-based discotic liquid crystal compound in the aforementioned expression (IV).

Examples of triphenylene compounds include those discussed in paragraphs [0062] to [0067] in Japanese Unexamined Patent Application, Publication No. 2007-108732, but are not limited thereto.

Figure 8:
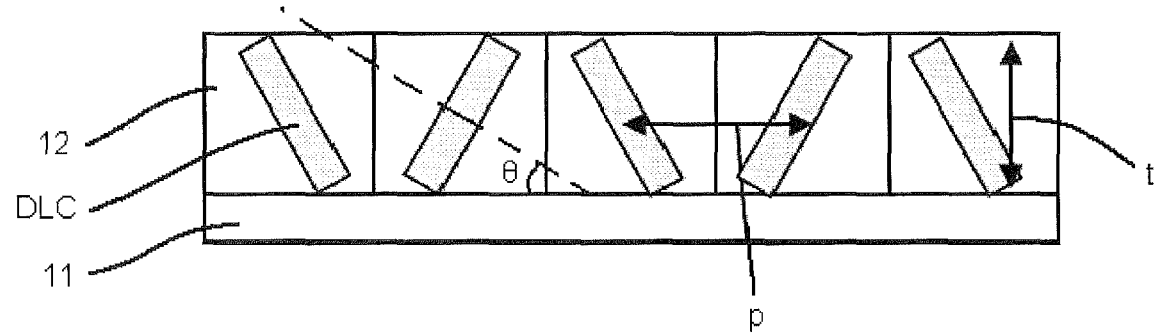
FIG. 8 is a cross-sectional view schematically illustrating an example of a light scattering film according to a first embodiment.

FIG. 8 is a cross-sectional view schematically illustrating an example of the light scattering film according to the first embodiment. A liquid crystal layer 12 is applied over a support member 11.

As shown in FIG. 8 as an example, it is preferable that the director of the discotic liquid crystal compound included in the liquid crystal layer be tilted at an angle θ ranging between ±30° and ±60° relative to the direction of the normal to the film surface of the light scattering film, and that the absolute values of the tilt angles be the same. Moreover, it is also preferable that alignment patterns with different positive and negative angle values, that is, an alignment pattern with a positive angle and an alignment pattern with a negative angle whose absolute value is equal to that of the positive angle, repeat in an alternating manner.

Figure 9:
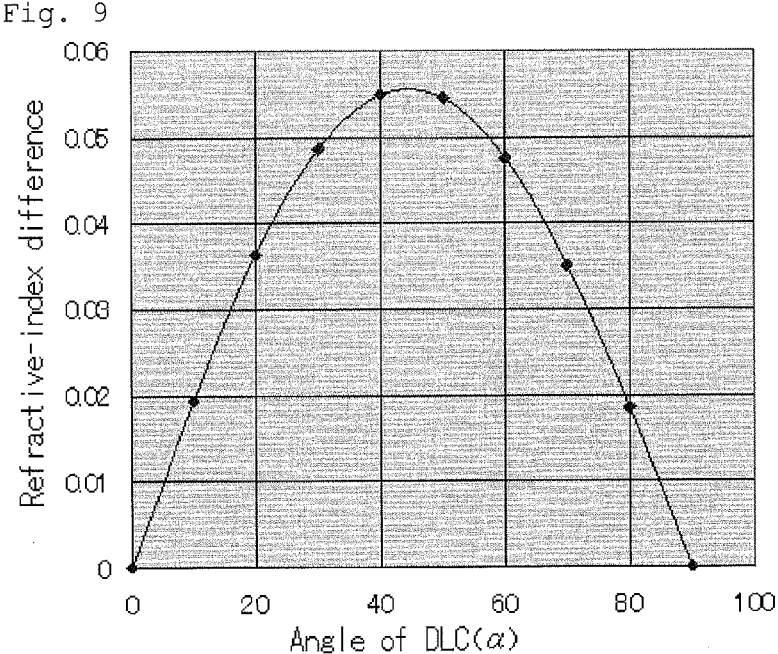
FIG. 9 schematically illustrates an example of the relationship between refractive-index difference and director angle.

FIG. 9 illustrates an example of the relationship between an angle α of the discotic liquid crystal compound and the refractive-index difference. With these alignment patterns, the difference between the refractive index $n_e$ and the refractive index $n_o$ (i.e., the refractive-index difference) becomes larger than or equal to 0.05, whereby downward grayscale inversion can be suppressed more effectively and front contrast can be increased.

The tilt angle of the director can be measured as follows.

Specifically, the director angle can be measured by using a polarizing microscope to observe and measure a cross section taken in the orthogonal direction to the film surface by using a microtome, or can be measured from Re(λ), Rth(λ), and the slow axis, which can be measured by using KOBRA-21ADH or KOBRA-WR.

In the liquid crystal layer according to the first embodiment, an alignment control agent, an unevenness inhibitor, a repelling inhibitor, a polymerization initiator, a polymerizable monomer, a plasticizer, a surfactant, or the like may be used together with the liquid crystal compound so that the evenness of the coating film, the film strength, the alignment of liquid crystal molecules, and so on can be improved. It is preferable that these materials have compatibility with the liquid crystal molecules and allow the tilt angles of the liquid crystal molecules to change or do not inhibit the alignment thereof. Specifically, examples discussed in, for example, Japanese Unexamined Patent Applications, Publication Nos. 2002-296423, 2001-330725, and 2000-155216 are preferred.

<<Alignment Film According to First Embodiment>>

In the first embodiment, in order to achieve a state where the liquid crystal molecules are uniformly aligned, it is preferable that an alignment film be disposed between the support member and the liquid crystal layer. The alignment film may be a rubbed alignment film or a photo-alignment film, but a photo-alignment film is preferred.

A photo-alignment film generates an alignment control force when irradiated with light. A photo-alignment material used in the photo-alignment film is preferably a photo-alignment polymer having a photo-reactive group. The term "photo-reactive group" refers to, for example, a functional group that can align, in a predetermined direction, the molecules of the liquid crystal compound disposed on the surface of the alignment film when a change occurs in the chemical structure of the functional group or in the alignment state of the molecules having this functional group due to being irradiated with light from one direction. Specific examples include an azobenzene derivative, a cinnamic acid derivative, a chalcone derivative, stilbenes, a styrylpyridine derivative, α-hydrazono-β-ketoesters, a coumarin derivative, benzylidenephthalimidines, a retinoic acid derivative, spiropyrans, spirooxazines, an anthracene derivative, a benzophenone derivative, and polyimide. Among these examples, the coumarin derivative, the styrylpyridine derivative, the azobenzene derivative, the cinnamic acid derivative, or the chalcone derivative is preferred. More preferably, the azobenzene derivative, the cinnamic acid derivative, or the chalcone derivative is used.

The photo-alignment material may be a low-molecular compound or a high-molecular compound. The type of high-molecular compound may be selected from among polymer types discussed on pages 1 to 4 of "*Kaito Koubunshi-Gousei no Kagaku*" (Otsu, Takayuki, Kabushiki-Kaisha Kagakudojin, 1968). Examples include polyolefins, polyesters, polyamides, polyimides, polyurethanes, polycarbonates, polysulfones, polycarbonates, polyethers, polyacetals, polyketones, polyphenylene oxides, polyphenylene sulfides, polyarylates, polytetrafluoroethylenes (PTFE), polyvinylidene fluorides, and a cellulose derivative. Among these examples, polyolefins are preferred.

Photo-alignment materials are discussed in many documents, etc. Preferred examples used as the material of the alignment film according to the present invention include azo compounds discussed in Japanese Unexamined Patent Applications, Publication Nos. 2006-285197, 2007-76839, 2007-138138, 2007-94071, 2007-121721, 2007-140465, 2007-156439, 2007-133184, and 2009-109831, and Japanese Patent Nos. 3883848 and 4151746; an aromatic ester compound discussed in Japanese Unexamined Patent Application, Publication No. 2002-229039; a maleimide and/or alkenyl substituted nadiimide compound having photo-alignment units discussed in Japanese Unexamined Patent Applications, Publication Nos. 2002-265541 and 2002-317013; photo-crosslinkable silane derivatives discussed in Japanese Patent Nos. 4205195 and 4205198; and photo-crosslinkable polyimide, polyamide, or ester discussed in Japanese Translation of PCT International Applications, Publication Nos. 2003-520878 and 2004-529220 and Japanese Patent No. 4162850. More preferably, the azo compound, the photo-crosslinkable polyimide, the photo-crosslinkable polyamide, or the photo-crosslinkable ester is used.

<<Formation of Liquid Crystal Layer>>

The liquid crystal layer can be formed by preparing a composition containing at least one kind of liquid crystal compound in the form of, for example, a coating solution and then coating the surface of the alignment film with the coating solution. The coating method is not limited in particular.

The liquid crystal layer according to the first embodiment can be formed by, for example, forming a patterned photo-alignment film by pattern exposure such that different patterned areas of the photo-alignment film have different alignabilities.

Specifically, an exposure process is performed by radiating unpolarized light from a predetermined angle in the clockwise direction relative to the normal to the layer surface via a striped mask. Subsequently, another exposure process is performed by radiating unpolarized light from a predetermined angle in the counterclockwise direction (preferably, the same angle as the predetermined angle in the clockwise direction). Consequently, a patterned photo-alignment film having an area where alignment is performed at the predetermined angle in the clockwise direction and an area where alignment is performed at the predetermined angle in the counterclockwise direction is formed.

The unpolarized light used for irradiation of the photo-alignment film is preferably ultraviolet light. The irradiation energy is preferably 20 mJ/cm$^2$ to 50 J/cm$^2$, more preferably 20 to 5000 mJ/cm$^2$, and most preferably 100 to 800 mW/cm$^2$.

The light source for the unpolarized light irradiation may be one that is usually used. Examples of the light source include lamps such as a tungsten lamp, a halogen lamp, a xenon lamp, a xenon flash lamp, a mercury lamp, a mercury-xenon lamp, and a carbon arc lamp; various lasers (e.g., a semiconductor laser, a helium-neon laser, an argon ion laser, a helium-cadmium laser, and a YAG laser); light-emitting diodes; and cathode-ray tubes.

By coating the patterned photo-alignment film with the coating solution for the liquid crystal layer and aligning the liquid crystal molecules, the liquid crystal molecules are aligned in the alignment-controllable directions of the respective patterns. By fixing this state by light radiation, the liquid crystal layer can be formed.

The light used for irradiation of the liquid crystal compound for polymerization is preferably ultraviolet light. The irradiation energy is preferably 20 mJ/cm$^2$ to 50 J/cm$^2$, more preferably 20 to 5000 mJ/cm$^2$, and most preferably 100 to 800 mW/cm$^2$. In order to facilitate the photo polymerization, the light irradiation may be performed under heating.

<<Liquid Crystal Layer According to Second Embodiment>>

In a second embodiment, a rod-like liquid crystal compound is used as the liquid crystal compound.

Figure 10:
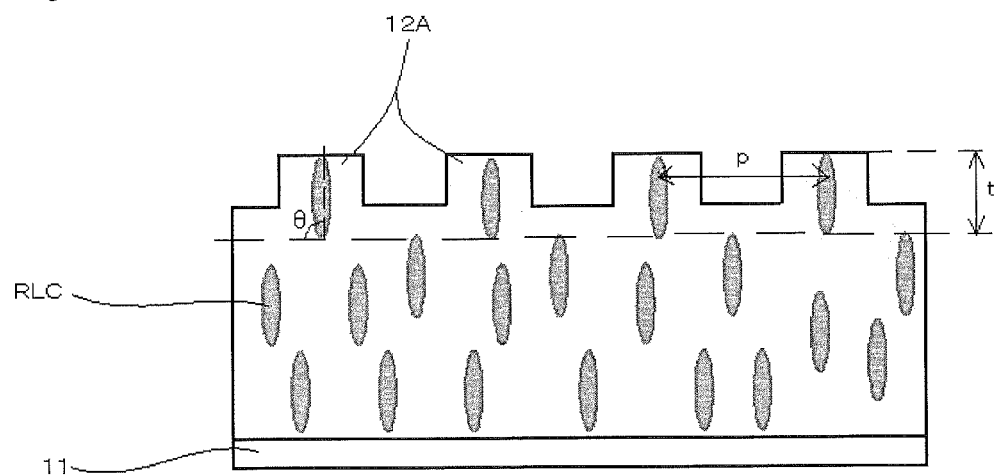
FIG. 10 is a cross-sectional view schematically illustrating an example of a light scattering film according to a second embodiment.

As shown in FIG. 10 as an example, in the second embodiment, a patterned liquid crystal layer 12A has a protrusion and a recess for each pitch p such that the rod-like liquid crystal compound forms a pattern with protrusions and recesses. This facilitates scattering of light. In the liquid crystal layer according to the second embodiment, the thickness of the liquid crystal layer corresponds to the height of the protrusions formed by the rod-like liquid crystal compound. In FIG. 10, the thickness is denoted by t.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds and alkenylcyclohexylbenzonitrile compounds. As an alternative to the low-molecular liquid crystal compound described above, a high-molecular liquid crystal compound may be used. In such a high-molecular liquid crystal compound, a rod-like liquid crystal compound having a low-molecular reactive group is polymerized. The following Formula (I) expresses one preferred example of a rod-like liquid crystal compound having a low-molecular reactive group.

$$Q^1\text{-}L^1\text{-}A^1\text{-}L^3\text{-}M\text{-}L^4\text{-}A^2\text{-}L^2\text{-}Q^2 \qquad \text{Formula (I)}$$

In the above foumula, $Q^1$ and $Q^2$ denote independent reactive groups, $L^1$, $L^2$, $L^3$, and $L^4$ each denote an independent single bond or bivalent linking group, $A^1$ and $A^2$ each denote an independent spacer group with 2 to 20 carbon atoms, and M denotes a mesogenic group.

Examples of rod-like liquid crystal compounds include those discussed in Japanese Translation of PCT International Application, Publication No. Hei 11-513019 and Japanese Unexamined Patent Application, Publication No. 2007-279688. However, the present invention is not limited to these examples.

The compound expressed by the Formula (I) can be synthesized based on a method discussed in Japanese Translation of PCT International Application, Publication No. Hei 11-513019 (WO 97/00600).

As shown in FIG. 10 as an example, the tilt angle θ of the director of the rod-like liquid crystal compound is preferably within ±10°, more preferably within ±8°, even more preferably within ±5°. In particular, the tilt angle is preferably 0°.

In order to set the director at an angle of 0° (i.e., orthogonal alignment), it is preferable that an additive for facilitating liquid-crystal alignment (i.e., alignment control agent) be added to the coating solution used for forming the liquid crystal layer. Examples of additives include a compound discussed in paragraphs [0055] to [0063] in Japanese Unexamined Patent Application, Publication No. 2009-223001 and a compound discussed in paragraphs [0023] to [0088] in Japanese Unexamined Patent Application, Publication No. 2008-026730. Furthermore, it is preferable that the alignment control agent shown below be added.

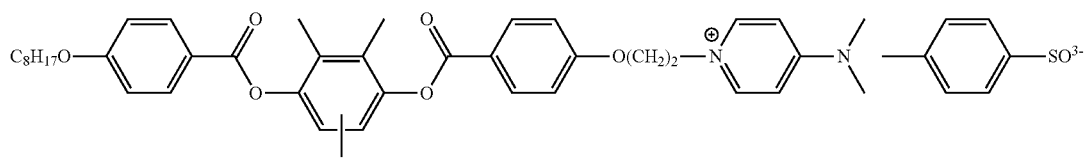

-continued

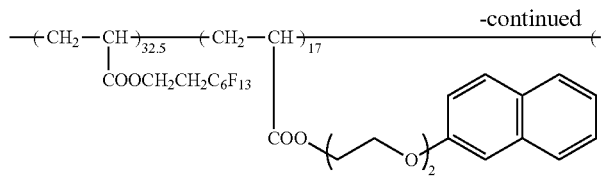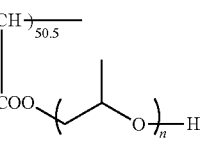

n=2 to 10

In the liquid crystal layer according to the second embodiment, an alignment control agent, an unevenness inhibitor, a repelling inhibitor, a polymerization initiator, a polymerizable monomer, a plasticizer, a surfactant, or the like may be used together with the liquid crystal compound so that the evenness of the coating film, the film strength, the alignment of liquid crystal molecules, and so on can be improved. It is preferable that these materials have compatibility with the liquid crystal molecules and allow the tilt angles of the liquid crystal molecules to change or do not inhibit the alignment thereof. Specifically, examples discussed in, for example, Japanese Unexamined Patent Applications, Publication Nos. 2002-296423, 2001-330725, and 2000-155216 are preferred.

<<Alignment Film According to Second Embodiment>>

In the second embodiment, in order to achieve a state where the liquid crystal molecules are uniformly aligned, it is preferable that an alignment film be disposed between the support member and the liquid crystal layer. The alignment film may be a rubbed alignment film or a photo-alignment film, but a rubbed alignment film is preferred.

The rubbed alignment film used may be the same as an alignment film having an optically anisotropic layer, to be described later.

Furthermore, the alignment film may contain at least one kind of photo-acid generator. A photo-acid generator is a compound that generates an acid compound by being decomposed by radiated light, such as ultraviolet light. When the photo-acid generator generates an acid compound by being decomposed by radiated light, a change occurs in the alignment controllability of the alignment film. In this case, a change in the alignment controllability may be a change in the alignment controllability of the alignment film alone, a change in the alignment controllability achieved by the alignment film and an additive or the like contained in an optically anisotropic layer forming composition disposed on the alignment film, or a change in the alignment controllability of the combination of the above.

Examples of photo-acid generators that can be used in the present invention include a compound discussed on page 1485 of "Prog. Polym. Sci.", Vol. 23, (1998). Specific preferred examples of photo-acid generators include pyridinium salt, iodonium salt, and sulfonium salt.

<<Formation of Liquid Crystal Layer>>

The liquid crystal layer according to the second embodiment is formed by, for example, impregnating a rubbed alignment film with a photo-acid generator and forming a patterned alignment film by pattern exposure such that different patterned areas of the alignment film have different alignabilities.

Specifically, a pattern exposure process is performed on the rubbed alignment film by radiating light thereto via a striped mask, whereby areas (exposure areas) where an acid compound is generated due to decomposition of the photo-acid generator and areas (non-exposure areas) where an acid compound is not generated are formed.

The light used for irradiation of the photo-alignment film is preferably ultraviolet light. The irradiation energy is preferably 20 mJ/cm$^2$ to 50 J/cm$^2$, more preferably 20 to 5000 mJ/cm$^2$, and most preferably 100 to 800 mW/cm$^2$.

The light source for the light irradiation may be one that is usually used. Examples of the light source include lamps such as a tungsten lamp, a halogen lamp, a xenon lamp, a xenon flash lamp, a mercury lamp, a mercury-xenon lamp, and a carbon arc lamp; various lasers (e.g., a semiconductor laser, a helium-neon laser, an argon ion laser, a helium-cadmium laser, and a YAG laser); light-emitting diodes; and cathode-ray tubes.

<Other Layers>

The light scattering film according to the second embodiment is preferably provided with a hard-coat layer over the liquid crystal layer. A hard-coat layer may also be formed over the liquid crystal layer of the light scattering film according to the first embodiment.

<<Hard-Coat Layer>>

By forming a hard-coat layer over the surface of the light scattering film according to the second embodiment, the protrusions and the recesses in the liquid crystal layer can be eliminated. In addition, downward grayscale inversion can be suppressed, and the front contrast can be increased.

Specific examples of hard-coat layers are discussed in paragraphs [0257] to [0262] in Japanese Unexamined Patent Application, Publication No. 2012-215817, the content of which is hereby incorporated into this specification by reference.

A refractive index measured in the orthogonal direction of the hard-coat layer is preferably equal to the refractive index $n_o$ measured in the orthogonal direction of the liquid crystal layer. Moreover, a refractive index measured in the 60° direction of the hard-coat layer is preferably different from the refractive index $n_e$ measured in the 60° direction of the liquid crystal layer.

[Liquid Crystal Cell]

The liquid crystal cell is a twisted-nematic (TN) liquid crystal cell in which the liquid crystal molecules are aligned in a twisted manner at a twist angle of substantially 90°. The liquid crystal cell includes a pair of substrates having electrodes that constitute pixels in at least one of opposing surfaces thereof, and a liquid crystal layer that is disposed between the substrates and in which the liquid crystal molecules are aligned in a twisted manner at a twist angle of 90°. Setting the twist angle to 90° is preferred since high front contrast can be achieved.

Although the liquid crystal display device according to the present invention may be of an optical rotation type or a birefringent type, a birefringent type is preferred in that downward grayscale inversion is less likely to occur and in that the viewing-angle range in which downward grayscale inversion occurs is narrow. In a known example of a birefringent type, the angle between the rubbing direction of each liquid-cell substrate and the slow axis of each polarizer is substantially 45° or 135°.

For example, the liquid crystal cell is provided with a plurality of thin film transistors (TFTs) corresponding to a plurality of pixel electrodes, a plurality of gate lines that supply gate signals to TFTs on each row, and a plurality of data lines that supply data signals to TFTs on each column. The plurality of pixel electrodes are connected to the TFTs that correspond to those pixel electrodes. Furthermore, a pair of opposing substrates and their opposing surfaces are provided with horizontal alignment films that cover electrode layers and that are subjected to alignment treatment in directions substantially orthogonal to each other. The liquid crystal layer is filled with a nematic liquid crystal material having positive dielectric anisotropy. With regard to the liquid crystal molecules in the liquid crystal layer, the alignment direction thereof near the first and second substrates is regulated by the horizontal alignment films. When an electric field is not applied between the electrode layers, the liquid crystal molecules between the substrates are aligned in a twisted manner at a twist angle of substantially 90°. On the other hand, when voltage that causes a black display is applied across the electrode layers, the liquid crystal molecules straighten out orthogonally relative to the substrate surfaces so as to become aligned at a predetermined average tilt angle $\theta$ (about 60° to) 90°. In this state, the polarized state of light propagating through the liquid crystal layer is different between when the light enters the liquid crystal layer from the direction of the normal and when the light enters the liquid crystal layer from a diagonal direction, due to a difference in the alignment of the liquid crystal molecules. As a result, grayscale inversion occurs depending on the viewing angle. In the liquid crystal display device according to the present invention, the light scattering film reduces the dependency of the grayscale inversion on the viewing angle so that the viewing-angle characteristics are improved.

Generally, $\Delta n \cdot d$, which is the product of the thickness d and the birefringence $\Delta n$ of the liquid crystal layer, ranges between about 300 nm and 600 nm in the case of the TN mode. In the present invention, it is preferable that $\Delta n \cdot d$ of the liquid crystal layer satisfy the following expression since this achieves a wider viewing angle in the TN mode.

$$200 \text{ nm} \leq \Delta n \cdot d \leq 600 \text{ nm}$$

In the case of the TN mode, it is more preferable that $\Delta n \cdot d$ range between 380 nm and 480 nm.

The liquid crystal layer may be of a multi-gap type in which the thickness varies among RGB sub-pixel areas. For example, instead of making the thickness of a color filter uniform, the R sub-pixels, the G sub-pixels, and the B sub-pixels may have different thicknesses so that a multi-gap liquid crystal layer can be formed. For example, $\Delta n \cdot d(R)$ of a liquid crystal layer corresponding to the R sub-pixels, $\Delta n \cdot d(G)$ of a liquid crystal layer corresponding to the G sub-pixels, and $\Delta n \cdot d(B)$ of a liquid crystal layer corresponding to the B sub-pixels satisfy the relationship $\Delta n \cdot d(B) < \Delta n \cdot d(G) < \Delta n \cdot d(R)$. With this example, a color image with high contrast and high color reproducibility can be displayed over a wide viewing-angle range.

On the other hand, with regard to the liquid crystal material used, $\Delta n(R)$ for R light, $\Delta n(G)$ for G light, and $\Delta n(B)$ for B light satisfy the relationship $\Delta n(B) < \Delta n(G) < \Delta n(R)$ so that the same advantages can be achieved even when the color filter has a uniform thickness.

The liquid crystal display device is in a normally-white mode and has a pair of polarizing layers that are disposed such that the absorption axes thereof are substantially orthogonal to each other.

The TN mode is discussed in detail in Japanese Unexamined Patent Application, Publication No. Hei 06-214116, U.S. Pat. Nos. 5,583,679 and 5,646,703, and German Patent Publication No. 3911620A1. A liquid-crystal-cell optical compensation sheet in an in-plane switching (IPS) mode or a ferroelectric liquid crystal (FLC) mode is discussed in Japanese Unexamined Patent Application, Publication No. Hei 10-54982. The contents of the above are hereby incorporated into this specification by reference.

[Optical Compensation Film]

The optical compensation film that can be used in the present invention includes, for example, a transparent support member and an optically anisotropic layer composed of a composition containing a liquid crystal compound. Although the optical compensation film is a part of a liquid crystal panel in the present invention, in the case where the optical compensation film includes the optically anisotropic layer and the transparent support member, the transparent support member may also function as a transparent layer serving as a part of a polarization plate. In this case, it is conceived that the optically anisotropic layer is a part of the liquid crystal panel, and the transparent support member is a part of the polarization plate.

<Support Member>

The support member used in the optical compensation film may be similar to the support member used in the light scattering film. The material used may be different from or the same as that used for the support member used in the light scattering film. The support member used in the optical compensation film preferably has a low Re and a low Rth.

As shown in FIGS. 11 to 14 as an example, the slow axis of the support member may be parallel to the slow axis of the optically anisotropic layer, which will be described below, or may be 45° or 135° relative to the slow axis of the optically anisotropic layer.

<Optically Anisotropic Layer>

Next, a preferred embodiment of the optically anisotropic layer used in the present invention will be described in detail. The optically anisotropic layer is preferably designed such that it performs compensation of the liquid crystal compound within the liquid crystal cell during a black display of the liquid crystal display device. The alignment state of the liquid crystal molecules within the liquid crystal cell during a black display is discussed in IDW '00, FMC7-2, pp. 411-414. The optically anisotropic layer preferably contains a liquid crystal compound whose alignment is controlled by an alignment axis, such as a rubbing axis, and that is stabilized in that alignment state. A protection layer may be provided over the optically anisotropic layer.

The liquid crystal compound used for forming the optically anisotropic layer may be a rod-like liquid crystal compound used for the liquid crystal layer in the light scattering film or may be a discotic liquid crystal compound.

If a rod-like liquid crystal compound is used for forming the optically anisotropic layer, it is preferable that an average direction of axes obtained by projecting the major axes of the rod-like liquid crystal molecules onto the support-member surface be parallel to the alignment axis. If a discotic liquid crystal compound is used for forming the optically anisotropic layer, it is preferable that an average direction of axes obtained by projecting the minor axes of the discotic liquid crystal molecules onto the support-member surface be parallel to the alignment axis. Moreover, hybrid alignment in which an angle (i.e., tilt angle) formed between the discotic plane and the flat layer plane changes in the depth direction is preferred.

Although it is not the actual condition, if it is expressed with an image, "hybrid alignment" means alignment in which an angle (hereinafter referred to as "a tilt angle") between a long axis direction of a liquid crystal compound and a horizontal plane of a layer formed of the compound changes in the thickwise direction of the layer. Examples of the manner of changing in a tilt angle include continuous increase, continuous decrease, intermittent increase, intermittent decrease, change comprising continuous increase and continuous decrease and intermittent change comprising increase and decrease. Embodiments of the intermittent changes comprise an area in which the tilt angle doesn't change in depth-direction. According to the present invention, it is preferred that the tilt angle increases or decreases as a whole whether the tilt angle change continuously or not. It is more preferred that the tilt angle increases as a whole with the position of the molecules being far from the substrate, and it is much more preferred that the tilt angle increases continuously as a whole with the position of the molecules being far from the substrate.

The optically anisotropic layer is preferably formed by fixing a liquid crystal composition containing a discotic liquid crystal compound into a hybrid alignment state. In this embodiment, the alignment control direction of the optically anisotropic layer is set based on, for example, a rubbing axis for rubbing treatment performed on the surface of the alignment film used, when forming the optically anisotropic layer, and generally matches the direction of the rubbing axis.

With the optically anisotropic layer in hybrid alignment, a ratio of the retardation R[+40°], which is measured from a direction tilted by 40 degrees from the direction of the normal, to the retardation R[−40°], which is measured from a direction tilted by 40 degrees in the reverse direction relative to the normal, in a plane orthogonal to an in-plane slow axis satisfies the following formula (I) or (II).

When R[+40°]>R[−40°], $$1.1 \leq R[+40°]/R[-40°] \leq 40 \quad (I)$$

When R[+40°]<R[−40°], $$1.1 \leq R[-40°]/R[+40°] \leq 40 \quad (II)$$

An average direction of major axes of discotic liquid crystal molecules at the support-member (or alignment-film) side can be generally adjusted based on the selection of the material of the discotic liquid crystal molecules or the alignment film or by selecting a rubbing method. The discotic-plane direction of the discotic liquid crystal molecules at the surface (or air) side can be generally adjusted based on the selection of the type of discotic liquid crystal molecules or the type of additive used together with the discotic liquid crystal molecules. Examples of additives used together with the discotic liquid crystal molecules include a plasticizer, a surfactant, a polymerizable monomer, and a polymerizable polymer. Similar to the above, the degree by which the alignment direction of the major axes is changed can be adjusted based on the selection of the liquid crystal molecules and the additive.

<<Other Additives in Optically Anisotropic Layer>>

The evenness of the coating film, the film strength, the alignment of liquid crystal molecules, and so on can be improved by using a plasticizer, a surfactant, a polymerizable monomer or the like together with the liquid crystal compound. It is preferable that these materials have compatibility with the liquid crystal molecules and allow the tilt angles of the liquid crystal molecules to change or do not inhibit the alignment thereof. Specifically, examples discussed in, for example, Japanese Unexamined Patent Applications, Publication Nos. 2002-296423, 2001-330725, and 2000-155216 are preferred.

<<Formation of Optically Anisotropic Layer>>

The optically anisotropic layer can be formed by preparing a composition containing at least one kind of liquid crystal compound and a polymerization initiator, to be described later, or an arbitrary component, where appropriate, as, for example, a coating solution and then coating the surface (e.g., rubbed surface) of the alignment film with the coating solution.

A solvent to be used for preparing the coating solution is preferably an organic solvent. Examples of organic solvents include an amide (e.g., N,N-dimethylformamide), a sulfoxide (e.g., dimethyl sulfoxide), a heterocyclic compound (e.g., pyridine), a hydrocarbon (e.g., benzene or hexane), an alkyl halide (e.g., chloroform, dichloromethane, or tetrachloroethane), an ester (e.g., methyl acetate or butyl acetate), a ketone (e.g., acetone or methyl ethyl ketone), and an ether (e.g., tetrahydrofuran or 1,2-dimethoxyethane). Among these examples, alkyl halide and ketone are preferred. Moreover, two or more kinds of organic solvents may be used.

The coating solution can be applied based on a commonly-known method (e.g., a wire bar coating method, an extrusion-coating method, a direct gravure coating method, a reverse gravure coating method, or a die-coating method).

The thickness of the optically anisotropic layer preferably ranges between 0.1 μm and 20 μm, more preferably between 0.5 μm and 15 μm, and most preferably between 1 μm and 10 μm.

The in-plane retardation of the optically anisotropic layer at a wavelength of 550 nm, Re(550), preferably ranges between 5 nm and 65 nm, more preferably between 7 nm and 60 nm, and even more preferably between 10 nm and 55 nm.

At the wavelength of 550 nm in the optically anisotropic layer, the ratio of the retardation R[+40°], measured from a direction tilted by 40 degrees from the direction of the normal, to the retardation R[−40°], measured from a direction tilted by 40 degrees in the reverse direction relative to the normal, in the plane orthogonal to the in-plane slow axis preferably satisfies the following formula (I) or (II).

When R[+40°]>R[−40°], $$1.1 \leq R[+40°]/R[-40°] \leq 40 \quad (I)$$

When R[+40°]<R[−40°], $$1.1 \leq R[-40°]/R[+40°] \leq 40 \quad (II)$$

<<Fixing of Alignment State of Liquid Crystal Molecules>>

The liquid crystal molecules aligned on the surface of the alignment film, etc. are preferably fixed while the alignment states thereof are maintained. This stabilization is preferably performed based on a polymerization reaction. A polymerization reaction includes a thermal polymerization reaction that involves the use of a thermal polymerization initiator and a photo-polymerization reaction that involves the use of a photo-polymerization initiator. The photo-polymerization reaction is preferred.

The amount of photo-polymerization initiator used preferably ranges from 0.01 to 20 percent by mass of the composition (i.e., solid content in the case of the coating solution), and more preferably ranges from 0.5 to 5 percent by mass.

Light radiated for causing polymerization of the liquid crystal molecules is preferably ultraviolet light. The radiation energy preferably ranges between 20 mJ/cm$^2$ and 50 J/cm$^2$, more preferably between 20 mJ/cm$^2$ and 5000 mJ/cm$^2$, and even more preferably between 100 mJ/cm$^2$ and 800 mJ/cm$^2$.

In order to facilitate the photo-polymerization reaction, the light radiation may be performed under increased-temperature conditions.

<<Alignment Film of Optically Anisotropic Layer>>

In the present invention, the alignment of the liquid crystal molecules within the optically anisotropic layer is controlled based on an alignment axis, and the liquid crystal molecules are preferably fixed in that state. An example of the alignment axis used for controlling the alignment of the liquid crystal molecules is a rubbing axis of the alignment film formed between the optically anisotropic layer and the polymer film (i.e., the support member). It should be noted that the alignment axis in the present invention is not limited to a rubbing axis and may be of any kind so long as it can control the alignment of the liquid crystal molecules in a manner similar to the rubbing axis.

The alignment film has a function of regulating the alignment direction of the liquid crystal molecules. Therefore, the alignment film is essential for achieving a preferred embodiment of the present invention. However, since the alignment film fulfills its role after aligning the liquid crystal molecules and fixing the alignment state thereof, the alignment film is not necessarily an essential element of the present invention. In other words, it is possible to fabricate the polarization plate according to the present invention by transferring only the optically anisotropic layer formed on the alignment film, by which the alignment state of liquid crystal molecules is fixed, onto the polarizers.

The alignment film may be provided by means of, for example, rubbing treatment using an organic compound (preferably a polymer), oblique evaporation of an inorganic compound, formation of a layer having microgrooves, or an accumulation of organic compounds (e.g., ω-tricosanoic acid, dioctadecyldimethylammonium chloride, and methyl stearate) based on the Langmuir-Blodgett method (LB film). Furthermore, an alignment film that exhibits an alignment function by being exposed to an electric field or a magnetic field or by being irradiated with light is also known.

The alignment film is preferably formed by performing rubbing treatment using a polymer. In principle, the polymer used for the alignment film has a molecular structure with a function for aligning the liquid crystal molecules. In the present invention, in addition to the function for aligning the liquid crystal molecules, it is preferable that a side chain having a crosslinking functional group (e.g., double bond) is bonded to a main chain or that a crosslinking functional group having a function for aligning the liquid crystal molecules be incorporated in a side chain. The polymer used for the alignment film may be a crosslinkable polymer, a polymer crosslinked by a crosslinking agent, or a combination of these polymers. Examples of polymers include, for example, a methacrylate-based copolymer, a styrene-based copolymer, polyolefin, polyvinyl alcohol and modified polyvinyl alcohol, poly-(N-methylolacrylamide), polyester, polyimide, a vinyl acetate copolymer, carboxymethyl cellulose, and polycarbonate discussed in paragraph [0022] in Japanese Unexamined Patent Application, Publication No. Hei 08-338913. Alternatively, a silane coupling agent may be used as the polymer. A water-soluble polymer (e.g., poly-(N-methylolacrylamide)), carboxymethyl cellulose, gelatin, polyvinyl alcohol, or modified polyvinyl alcohol is preferred. More preferable is gelatin, polyvinyl alcohol, or modified polyvinyl alcohol. The most preferable is polyvinyl alcohol or modified polyvinyl alcohol. It is especially preferable to use both polyvinyl alcohol and modified polyvinyl alcohol with different degrees of polymerization. Specific examples of modified polyvinyl alcohol compounds include those discussed in paragraphs [0022] to [0145] in Japanese Unexamined Patent Application Publication No. 2000-155216 and paragraphs [0018] to [0022] in Japanese Unexamined Patent Application Publication No. 2002-62426.

The saponification degree of polyvinyl alcohol preferably ranges between 70% and 100% and more preferably between 80% and 100%. The degree of polymerization of polyvinyl alcohol preferably ranges between 100 and 5000.

By bonding the side chain having the crosslinking functional group to the main chain of the alignment-film polymer or by incorporating the crosslinking functional group to the side chain having the function for aligning the liquid crystal molecules, the alignment-film polymer and the polyfunctional monomer included in the optically anisotropic layer can be copolymerized. As a result, in addition to the polyfunctional monomers being tightly bonded to each other, the alignment-film polymers can be tightly bonded to each other, and the polyfunctional monomers and the alignment-film polymers can also be tightly bonded to each other. Consequently, by incorporating the crosslinking functional group to the alignment-film polymer, the strength of the optical compensation sheet can be significantly increased.

Similar to the polyfunctional monomer, the crosslinking functional group of the alignment-film polymer preferably includes a polymerizable group. Specific examples include those discussed in paragraphs [0080] to [0100] in Japanese Unexamined Patent Application, Publication No. 2000-155216.

In addition to the aforementioned crosslinking functional group, a crosslinking agent may be used to crosslink the alignment-film polymers. Examples of crosslinking agents include aldehyde, an N-methylol compound, a dioxane derivative, a compound that achieves its function by activating a carboxyl group, an active vinyl compound, an active halogen compound, isoxazole, and dialdehyde starch. Two or more kinds of crosslinking agents may be used in combination with each other. Specific examples include compounds discussed in paragraphs [0023] to [0024] in Japanese Unexamined Patent Application, Publication No. 2002-62426. Aldehyde, which has high reaction activity, or glutaraldehyde in particular, is preferred.

The amount of crosslinking agent to be added preferably ranges from 0.1 to 20 percent by mass relative to the polymer, and more preferably from 0.5 to 15 percent by mass. The amount of unreacted crosslinking agent remaining in the alignment film is preferably lower than or equal to 1.0 percent by mass, and more preferably lower than or equal to 0.5 percent by mass. By performing such adjustment, sufficient durability with no occurrence of reticulation can be achieved even when the alignment film is used in the liquid crystal display device over a long period of time or when the device is left in a high-temperature high-humidity environment for a long period of time.

The alignment film can be basically formed by applying an alignment-film forming material containing the aforementioned polymer and the aforementioned crosslinking agent over the transparent support member, drying (crosslinking) the material by heating, and then performing rubbing treatment thereon. As mentioned above, the crosslinking reaction may be performed at desired timing after applying the material over the transparent support member. If a water-soluble polymer, such as polyvinyl alcohol, is used as the alignment-film forming material, the coating solution is preferably a mixed solvent containing an organic solvent (e.g., methanol), which has a defoaming effect, and water. The mass ratio of water to methanol preferably ranges between 0:100 and 99:1, and more preferably between 0:100 and 91:9. Consequently, the occurrence of foaming is suppressed, thereby significantly reducing defects in the alignment film as well as the layer surface of the optically anisotropic layer.

The coating method used for forming the alignment film is a spin coating method, a dip coating method, a curtain coating method, an extrusion coating method, a rod coating method, or a roll coating method. In particular, the rod coating method is preferred. The thickness after drying preferably ranges between 0.1 μm and 10 μm. The heat-drying process may be performed in a temperature range between 20° C. and 110° C. In order to achieve sufficient crosslinking, the temperature preferably ranges between 60° C. and 100° C., and more preferably between 80° C. and 100° C. The drying time may be one minute to 36 hours, and preferably one minute to 30 minutes. It is preferable that the pH be set to an optimal value for the crosslinking agent used. If glutaraldehyde is used, the pH ranges between 4.5 and 5.5. In particular, 5 is preferred.

The alignment film is provided over the transparent support member or over the aforementioned undercoat layer. As described above, the alignment film can be obtained by crosslinking a polymer layer and then performing rubbing treatment on the surface thereof.

Subsequently, the alignment film is made to align the liquid crystal molecules in the optically anisotropic layer provided on the alignment film. Then, where appropriate, the alignment-film polymer is made to react with the polyfunctional monomer included in the optically anisotropic layer, or the alignment-film polymers are crosslinked by using the crosslinking agent.

The alignment film preferably has a thickness ranging between 0.1 μm and 10 μm.

Furthermore, the optical compensation film may be fabricated by stretching the film.

[First and Second Polarizers]

The liquid crystal display device according to the present invention has the first and second polarizers whose absorption axes are disposed orthogonally to each other. With regard to each of the first and second polarizers, an optical compensation film is formed over the liquid-crystal-cell-side surface of the polarizer. An elliptically-polarizing plate having a protection film formed thereon is used at the other surface of the polarizer.

The elliptically-polarizing plate can be fabricated by laminating the optical compensation film and a linear polarizer (when the term "polarizer" is simply used, the term refers to "linear polarizer" hereinafter). The optical compensation film may also serve as a protection film for the linear polarizer.

The linear polarizer is preferably a coated-type polarizing film as typified by those manufactured by Optiva Inc., or a polarizing film composed of a binder and iodine or dichroic pigment. The iodine or the dichroic pigment in the linear polarizing film is aligned within the binder so that polarizing effect is exhibited. The iodine or the dichroic pigment is preferably aligned along the binder molecules, or the dichroic pigment is preferably aligned in one direction due to its self-organizing function, like that of liquid crystal. Currently-available polarizers are generally fabricated by immersing a stretched polymer in an iodine or dichroic pigment solution within a tub and then impregnating the binder with the iodine or the dichroic pigment.

The protection films bonded to the surfaces of the first and second polarizers are not particularly limited and are preferably selected from examples of polymer films that can be used as the aforementioned support member. Preferred examples of protection films include cellulose acylate films, such as cellulose triacetate films.

In the present invention, the alignment axes of the substrates of the liquid crystal cell, the absorption axes of the linear polarizing films, and/or the alignment axis of the optically anisotropic layer is/are adjusted to a specific angle or angles.

[Liquid Crystal Display Device]

Figure 11:
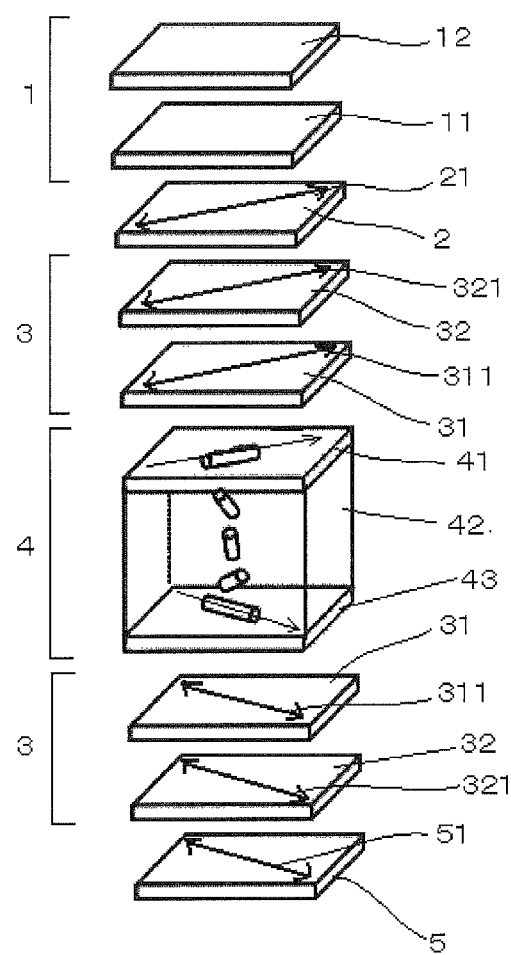
FIG. 11 schematically illustrates an example of a liquid crystal display device according to the present invention.

As shown in FIG. 11 as an example, in the liquid crystal display device that uses the twisted-nematic liquid crystal cell according to the present invention, an absorption axis 21 of a first polarizer 2 is disposed at an angle of 0° relative to the liquid-crystal director direction at the surface of a substrate 41 within a liquid crystal cell 4 adjoining the first polarizer 2. The absorption axis 21 of the first polarizer 2 is orthogonal to an absorption axis 51 of a second polarizer 5. A slow axis 321 of a transparent support member 32 and a slow axis 311 of an optically anisotropic layer 31 in an optical compensation film 3 at the first polarizer 2 side are disposed parallel to the absorption axis 21 of the first polarizer 2. A slow axis 321 of a transparent support member 32 and a slow axis 311 of an optically anisotropic layer 31 in an optical compensation film 3 at the second polarizer 5 side are disposed parallel to the absorption axis 51 of the second polarizer 5.

Figure 12:
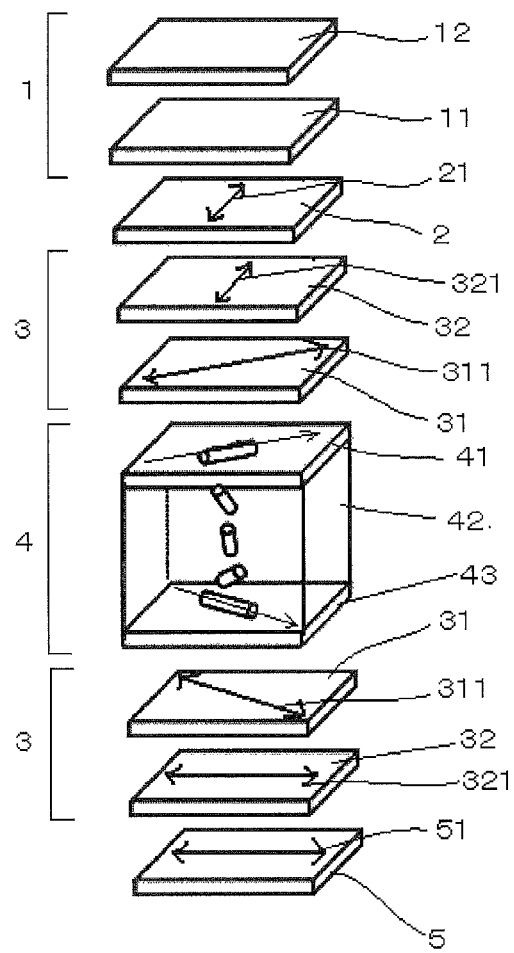
FIG. 12 schematically illustrates another example of the liquid crystal display device according to the present invention.

Alternatively, as shown in FIG. 12 as an example, in the liquid crystal display device according to the present invention, the absorption axis 21 of the first polarizer 2 may be disposed substantially at an angle of 45° relative to the liquid-crystal director direction at the surface of the substrate 41 within the liquid crystal cell 4 adjoining the first polarizer 2. The absorption axis 21 of the first polarizer 2 may be orthogonal to the absorption axis 51 of the second polarizer 5. The slow axis 321 of the transparent support member 32 in the optical compensation film 3 at the first polarizer 2 side may be disposed parallel to the absorption axis 21 of the first polarizer 2. The slow axis 311 of the optically anisotropic layer 31 may be disposed substantially at an angle of 45° relative to the absorption axis 21 of the first polarizer 2. In the optical compensation film 3 at the second polarizer 5 side, the slow axis 321 of the transparent support member 32 may be disposed parallel to the absorption axis 51 of the second polarizer 5, and the slow axis 311 of the optically anisotropic layer 31 may be disposed substantially at an angle of 45° relative to the absorption axis 51 of the second polarizer 5.

Figure 13:
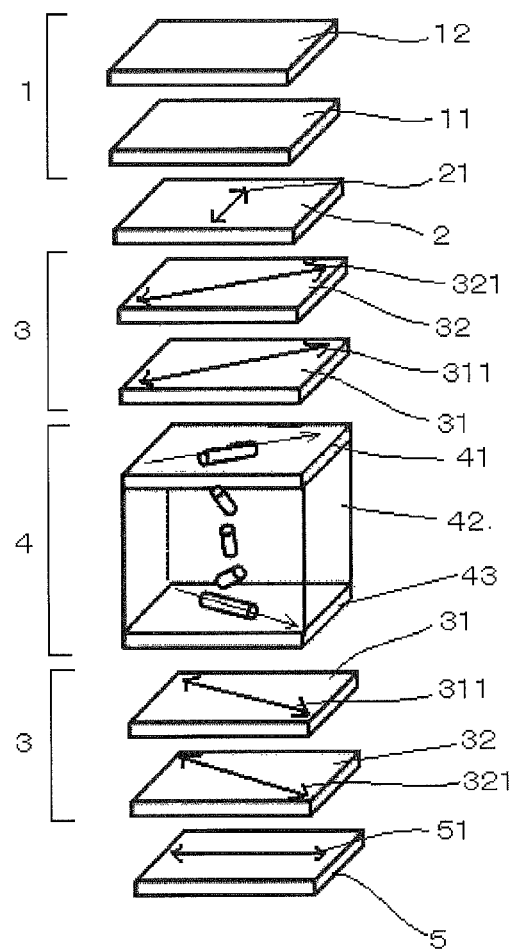
FIG. 13 schematically illustrates another example of the liquid crystal display device according to the present invention.

As another alternative, as shown in FIG. 13 as an example, the absorption axis 21 of the first polarizer 2 may be disposed substantially at an angle of 45° relative to the liquid-crystal director direction at the surface of the substrate 41 within the liquid crystal cell 4 adjoining the first polarizer 2. The absorption axis 21 of the first polarizer 2 may be orthogonal to the absorption axis 51 of the second polarizer 5. The slow axis 321 of the transparent support member 32 and the slow axis 311 of the optically anisotropic layer 31 in the optical compensation film 3 at the first polarizer 2 side may be disposed substantially at an angle of 45° to the absorption axis 21 of the first polarizer 2. Likewise, the slow axis 321 of the transparent support member 32 and the slow axis 311 of the optically anisotropic layer 31 in the optical compensation film 3 at the second polarizer 5 side may be disposed substantially at an angle of 45° relative to the absorption axis 51 of the second polarizer 5.

Figure 14:
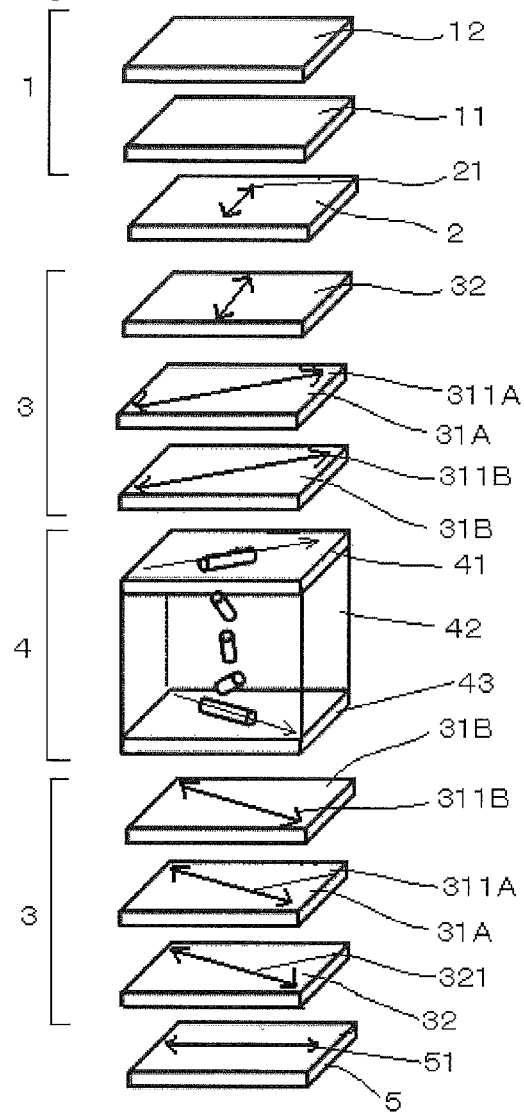
FIG. 14 schematically illustrates another example of the liquid crystal display device according to the present invention.

As a further alternative, as shown in FIG. 14 as an example, an optical compensation film having two layers, that is, an optically anisotropic layer 31A and an optically anisotropic layer 31B, may be used in the configuration shown in FIG. 11.

Furthermore, the liquid crystal display device according to the present invention may include other components. For example, a color filter may be disposed between the liquid crystal cell and a polarizing film. If the device is of a transmission type, a backlight having a cold cathode fluorescent tube, a hot cathode fluorescent tube, a light-emitting diode, a field emission element, or an electroluminescent element serving as a light source may be disposed at the back side.

The light scattering film is preferably disposed at the viewing side of the first and second polarizers so that grayscale inversion can be significantly suppressed when viewed from below, while deterioration of the front contrast can be suppressed.

Furthermore, in order to increase the light-emitting efficiency of the backlight, a light-collecting-type brightness increasing sheet (film) in the form of a prism or a lens or a polarization-reflectance-type brightness increasing sheet (film) that suppresses optical loss caused by absorption by a polarization plate may be laminated between the backlight and the liquid crystal cell. Furthermore, a diffusion sheet (film) for making the light from the light source of the backlight uniform may be laminated, or a sheet (film) having a reflection-diffusion pattern formed thereon by, for example, printing for achieving a planar distribution of the light source may be laminated.

A brightness half-width angle of light emitted from the backlight according to the present invention is preferably smaller than or equal to 80°, more preferably smaller than or equal to 60°, and most preferably smaller than or equal to 40°. This value can be achieved by using a prism sheet or a light guide plate having light directivity or by laminating the prism sheet. The aforementioned range is preferred in that grayscale inversion can be suppressed.

The term "brightness half-width angle" refers to an angle at which the front brightness becomes half, and is the total value of angles at the upper and lower sides or the left and right sides. If the value varies between the upper and lower sides or the left and right sides, the wider angle is taken.

EXAMPLES

The present invention will be described below in further detail with reference to the following examples. In the following examples, materials, usage amounts, percentages, processing details, procedures, and so on may be changed, where appropriate, so long as they do not deviate from the spirit of the invention. Therefore, the scope of the present invention is not to be limited to the specific examples described below.

Example 1

Fabrication of Optically Anisotropic Layer

<<Fabrication of Transparent Support Member>>

A cellulose acetate solution C-1 was prepared by injecting the composition shown below into a mixing tank and stirring the composition while heating it to 30° C. to dissolve the components.

| Composition of Cellulose Acetate Solution (C-1) (Parts by Mass) | Inner Layer | Outer Layer |
|---|---|---|
| Cellulose Acetate with Acetylation Degree of 60.9% | 100 | 100 |
| Triphenyl Phosphate (Plasticizer) | 7.8 | 7.8 |
| Biphenyl Diphenyl Phosphate (Plasticizer) | 3.9 | 3.9 |
| Methylene Chloride (First Solvent) | 293 | 314 |
| Methanol (Second Solvent) | 71 | 76 |
| 1-Buthanol (Third Solvent) | 1.5 | 1.6 |

| Composition of Cellulose Acetate Solution (C-1) (Parts by Mass) | Inner Layer | Outer Layer |
|---|---|---|
| Silica Microparticles (AEROSIL R972 by Nippon Aerosil Co., Ltd.) | 0 | 0.8 |
| Retardation Increasing Agent | 1.7 | 0 |

Retardation Increasing Agent

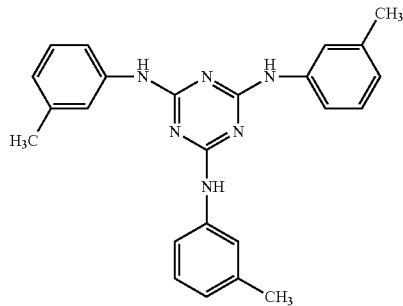 [SMILES: Cc1cccc(Nc2nc(Nc3cccc(C)c3)nc(Nc3cccc(C)c3)n2)c1]

By using a three-layer co-casting die, the inner-layer dope and the outer-layer dope of the obtained solution C-1 were flow-casted onto a drum, which was cooled to 0° C. A film with a remaining solvent amount of 70 percent by mass was peeled from the drum. Opposite edges of the film were fixed in position by using a pin tenter, and the film was dried at 80° C. while being conveyed with a drawing ratio of 110% in the conveying direction. When the remaining solvent amount reached 10%, the film was dried at 110° C. Subsequently, the film was dried for 30 minutes at a temperature of 140° C. Consequently, transparent support members 1 and 2 each formed of a cellulose acetate film (with a thickness of 80 μm (i.e., outer layer: 3 μm, inner layer: 74 μm, and outer layer: 3 μm) in which the remaining solvent was 0.3 percent by mass were fabricated. The in-plane retardation Re of each transparent support member at a wavelength of 550 nm was 9 nm, and the retardation Rth in the thickness direction was 90 nm.

After immersing the fabricated cellulose acetate in a 2.0-N potassium hydroxide solution (25° C.) for two minutes, the cellulose acetate was neutralized with sulfuric acid. Then, after washing the cellulose acetate with purified water, the cellulose acetate was dried.

<<Fabrication of Alignment Film>>

A coating solution H-1 having the composition shown below was applied at 28 mL/m$^2$ over the transparent support member by using a #16 wire bar coater. The coating solution was dried for 60 seconds with warm air at a temperature of 60° C., and was further dried for 150 seconds with warm air at a temperature of 90° C. Then, rubbing treatment was performed on the formed film surface by rotating a rubbing roller thereon in a direction parallel to the conveying direction at 500 rotations per minute, whereby an alignment film was fabricated.

(Composition of Alignment-Film Coating Solution H-1)

Modified polyvinyl alcohol: 10 parts by mass

Water: 370 parts by mass

Methanol: 120 parts by mass

Glutaraldehyde (crosslinking agent): 0.5 parts by mass

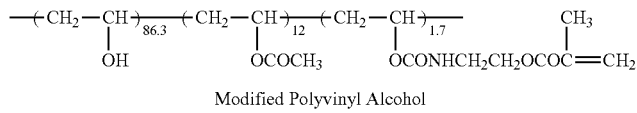

Modified Polyvinyl Alcohol

<<Fabrication of Optically Anisotropic Layer>>

The coating solution K-1 shown below was continuously applied onto the alignment film surface by using a #3.2 wire bar. The solvent was dried by being heated continuously from room temperature to 100° C. Subsequently, the solvent was heated for about 90 seconds in a 135° C. drying zone, thereby aligning the discotic liquid crystal molecules. Then, the solvent was conveyed to a drying zone in which the drying temperature is 80° C. Once the surface temperature of the film was about 100° C., the solvent was irradiated with ultraviolet light with an intensity of 600 mW from an ultraviolet emitting device for 10 seconds so as to induce a crosslinking reaction, whereby the discotic liquid crystal compound was polymerized. Subsequently, the solvent was left to cool to room temperature so as to form an optically anisotropic layer, whereby each of optical compensation films 1 and 2 was fabricated.

(Composition of Optically Anisotropic Layer Coating Solution K-1)
Methyl ethyl ketone: 98 parts by mass
Discotic liquid crystal compound (I): 41.01 parts by mass
Ethylene-oxide modified trimethylolpropane triacrylate (V#360 manufactured by Osaka Organic Chemical Industry Ltd.): 4.06 parts by mass
Cellulose acetate butyrate (CAB551-0.2 manufactured by Eastman Chemical Company): 0.34 parts by mass
Cellulose acetate butyrate (CAB531-1 manufactured by Eastman Chemical Company): 0.11 parts by mass
Fluoro-aliphatic-group-containing polymer 1: 0.13 parts by mass
Fluoro-aliphatic-group-containing polymer 2: 0.03 parts by mass
Photo-polymerization initiator (IRGACURE 907 manufactured by Ciba-Geigy K.K.): 1.35 parts by mass
Sensitizer (Kayacure DETX manufactured by Nippon Kayaku Co., Ltd): 0.45 parts by mass

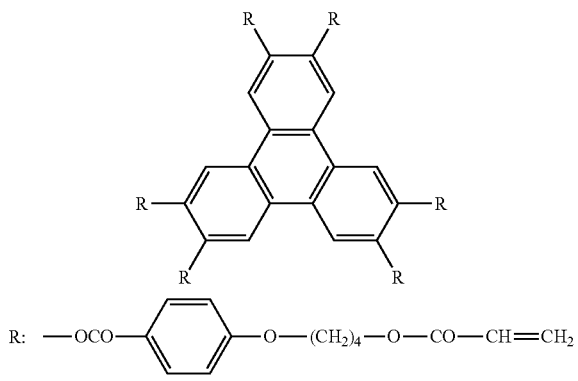

Discotic Liquid Crystal Compound 1

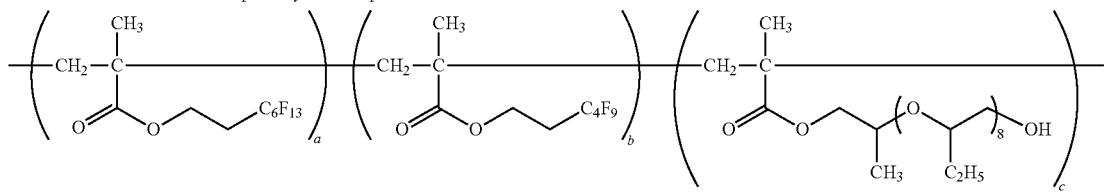

(a/b/c = 20/20/60 wt %)
Fluoro-Aliphatic-Group-Containing Polymer 1

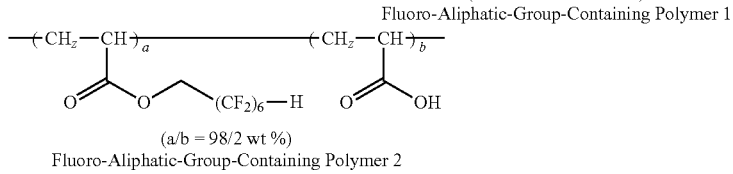

(a/b = 98/2 wt %)
Fluoro-Aliphatic-Group-Containing Polymer 2

<<Measurement of Optical Characteristics>>

With regard to the measurement of each optically anisotropic layer, another optically anisotropic layer was similarly fabricated except that the support member was changed to a glass substrate (EAGLE XG manufactured by Corning Incorporated). Then, by using KOBRA-WR (manufactured by Oji Scientific Instruments), the in-plane retardation at a wavelength of 550 nm, Re(550), was measured. Furthermore, in a plane orthogonal to the slow axis of the optically anisotropic layer, the retardation R[+40°] and retardation R[−40°] were measured by radiating light with a wavelength of 550 nm from a direction tilted by ±40 degrees from the direction of the normal, and R[−40°]/R[+40°] was calculated.

<Fabrication of Light Scattering Film>

<<Fabrication of Transparent Support Member a Provided with Patterned Alignment Film>>

After preparing the patterned-alignment-film composition shown below, the composition was filtered by using a polypropylene filter with a hole diameter of 0.2 μm, whereby a patterned-alignment-film coating solution was formed. The coating solution was applied over the surface of a cellulose triacetate film (TAC-TD80UL manufactured by Fujifilm Corporation) by using a #14 bar and was dried for one minute at 100° C. Then, a striped mask was disposed on the alignment film such that the stripes extended parallel to the conveying direction. The coating solution was irradiated with ultraviolet light with an intensity of 50 mW/cm² at 365 nm under air for 2 seconds by using an air-cooled metal halide lamp (manufactured by Eye Graphics Co., Ltd.) so as to decompose the photo-acid generator and generate an acid compound, whereby an alignment film was formed. In this case, an exposure process was performed by using the striped mask whose transmitting areas have a stripe width of 1 μm and whose blocking areas have a stripe width of 1 μm. After performing the mask exposure process, rubbing treatment was performed for one lap at 1000 rpm at a 45-degree angle relative to the conveying direction of the film. The film thickness of the patterned alignment film was 0.5 μm.

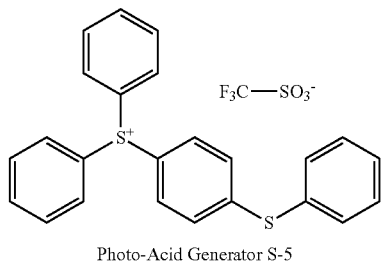

Photo-Acid Generator S-5

<<Fabrication of Light Scattering Film A>>

After preparing the liquid-crystal-layer composition shown below, the composition was filtered by using a polypropylene filter with a hole diameter of 0.2 μm and was used as a coating solution. The coating solution was applied over the surface of a cellulose triacetate film provided with a patterned alignment film (TAC-TD80UL manufactured by Fujifilm Corporation) by using a #3 bar and was dried for two minutes at 105° C., whereby a liquid crystal phase was obtained. Subsequently, the coating solution was cooled to 75° C. and was irradiated with ultraviolet light with an intensity of 160 W/cm² under air by using an air-cooled metal halide lamp (manufactured by Eye Graphics Co., Ltd.) so that the alignment state thereof was fixed, whereby a light scattering film A was fabricated.

(Liquid-Crystal-Layer Composition)

Rod-like liquid crystal compound (LC-242 manufactured by BASF Corporation): 100 parts by mass
Vertical alignment agent A: 0.5 parts by mass
Vertical alignment agent B: 1.0 parts by mass
Photo-polymerization initiator (IRGACURE 907 manufactured by BASF Corporation): 3.3 parts by mass
Sensitizer (Kayacure DETX manufactured by Nippon Kayaku Co., Ltd): 1.1 parts by mass
Methyl ethyl ketone: 3000 parts by mass

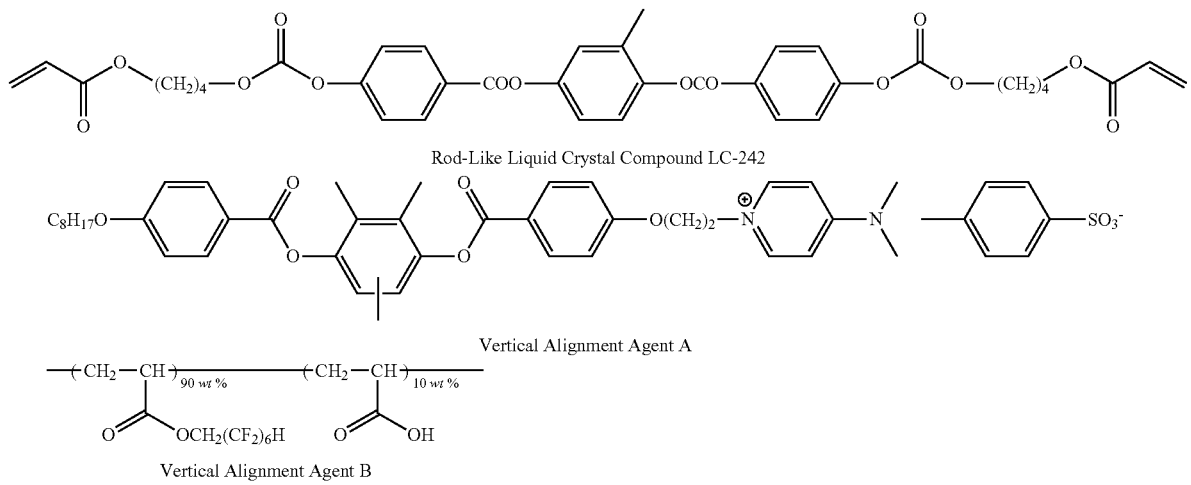

(Composition of Patterned Alignment Film)
Polymer material (PVA-103, polyvinyl alcohol manufactured by Kuraray Co., Ltd.): 2.4 parts by mass
Photo-acid generator (S-5): 0.11 parts by mass
Methanol: 16.7 parts by mass
Isopropanol: 7.4 parts by mass
Water: 73.4 parts by mass <<Evaluation of Shapes>>

Figure 15:
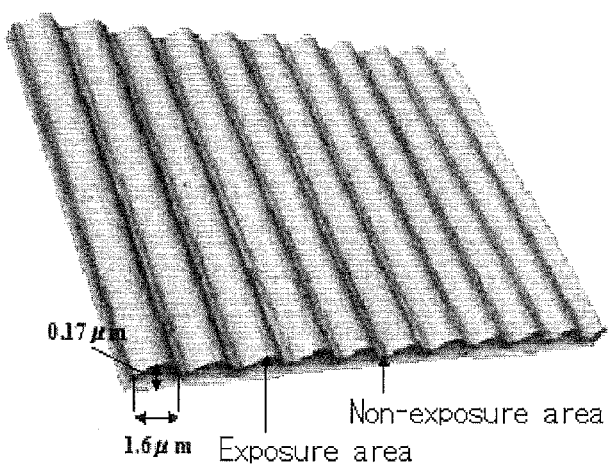
FIG. 15 schematically illustrates a liquid crystal layer surface of a light scattering film fabricated in Example 1.

The shapes of exposure areas (first phase-difference-area alignment film) and non-exposure areas of the formed light scattering film A were analyzed by using VertScan2.0 (manufactured by Ryoka Systems Inc.). As a result, the exposure areas of the liquid crystal layer had a thickness of 0.17 μm and were arranged at 1.6 μm pitch, whereas the non-exposure areas had a thickness of substantially 0 μm, as shown in FIG. 15.

<<Evaluation of Optical Performance>>

Next, in accordance with the above-described method using KOBRA-21ADH (manufactured by Oji Scientific Instruments), the alignment state of the rod-like liquid crystal molecules in the liquid crystal layer, the directions of the slow axes, and Re and Rth were measured. The measurement results indicated that Re(550) was 0 nm and Rth(550) was 9 nm. Due to the two kinds of vertical alignment agents, the rod-like liquid crystal molecules were aligned on the patterned alignment film, thereby obtaining a patterned liquid crystal layer in which the rod-like liquid crystal molecules in the exposure areas were vertically aligned (i.e., the tilt angle of the director was 0°) relative to the alignment-film surface.

<<Measurement of Scattering Area Ratio>>

By using a goniophotometer (GP-5 manufactured by Murakami Color Research Laboratory), light was radiated onto the film surface of the obtained light scattering film A from the direction of the normal thereto, and the light intensity of the scattered light was measured in a range between −80° and +80° relative to the direction of the normal to the film surface of the light scattering film A. The measured light intensity is defined as $S_0(\theta)$. Furthermore, light was radiated onto the film surface of the light scattering film A from the 60° direction, and the light intensity of the scattered light was measured in a range between −80° and +80° relative to the incident direction. The measured light intensity is defined as $S_{60}(\theta)$.

<Fabrication of Polarization Plate>

A polarization plate was fabricated by laminating the fabricated optical compensation film 1 such that the transparent-support-member side and the polarizing-film side faced each other. The laminated surface of the film was subjected to alkali saponification treatment. Furthermore, the polarizing film used was a 20-μm-thick linearly polarizing film fabricated by continuously stretching out an 80-μm-thick polyvinyl alcohol film to five times its size within an iodine aqueous solution and then drying the polyvinyl alcohol film. The adhesive used was an aqueous solution with 3% polyvinyl alcohol (PVA-117H manufactured by Kuraray Co., Ltd.).

<Fabrication of TN Liquid Crystal Display Device>

A polarization plate used in a TN liquid crystal display device (S23A350H manufactured by Samsung Electronics Co., Ltd.) was removed therefrom. Then, the above-described polarization plate was bonded to each of the viewing side and the backlight side by means of an adhesive so that the configuration shown in FIG. 11 was obtained. The light scattering film was bonded to the polarization plate at the viewing side of the TN liquid crystal display device by means of an adhesive.

Example 2

A TN liquid crystal display device was fabricated in a manner similar to that in Example 1 except that the light scattering film A in Example 1 was coated with the following liquid crystal layer and hard-coat layer.

<<Fabrication of Liquid Crystal Layer B>>

A patterned liquid crystal layer B was fabricated in a manner similar to that in Example 1 except that the composition of the liquid crystal layer was changed to that shown below, a #12 bar was used, and the film thickness was changed.

(Liquid-Crystal-Layer Composition)
Rod-like liquid crystal compound (LC-242 manufactured by BASF Corporation): 100 parts by mass
Vertical alignment agent A: 0.5 parts by mass
Vertical alignment agent B: 1.0 parts by mass
Photo-polymerization initiator (IRGACURE 907 manufactured by BASF Corporation): 3.3 parts by mass
Sensitizer (Kayacure DETX manufactured by Nippon Kayaku Co., Ltd): 1.1 parts by mass
Methyl ethyl ketone: 300 parts by mass <Formation of Hard-Coat Layer>

A hard-coat-layer curable resin composition was fabricated by mixing the constituents shown below.
Silica microparticles (MEKST manufactured by Nissan Chemical Industries, Ltd.): 133 parts by mass (solid content: 40 parts by mass)
DPHA: 60 parts by mass
IRGACURE 184: 4 parts by mass
MEK: 57 parts by mass The aforementioned curable resin composition was applied as a hard-coat-layer curable resin composition over an uneven surface of the fabricated patterned liquid crystal layer B and was dried for 60 seconds within a heated oven set at 70° C. so that the solvent in the coating film was evaporated. The coating film was cured by being irradiated with ultraviolet light such that the cumulative light level was 200 mJ/cm$^2$, whereby a hard-coat layer with a thickness of 7 μm (when dried) was formed. In this state, the protrusions and recesses of the patterned liquid crystal layer B were completely covered so that a smooth surface was obtained.

<<Evaluation of Shapes>>

The shapes of exposure areas (first phase-difference-area alignment film) and non-exposure areas of the formed patterned liquid crystal layer B were analyzed by using VertScan2.0 (manufactured by Ryoka Systems Inc.). As a result, the exposure areas had a thickness of 6.3 μm and were arranged at 1.6 μm pitch, whereas the non-exposure areas had a thickness of substantially 0 μm.

<<Evaluation of Optical Performance>>

Next, in accordance with the above-described method using KOBRA-21ADH (manufactured by Oji Scientific Instruments), the alignment state of the rod-like liquid crystal molecules, the directions of the slow axes, and Re and Rth were measured. The measurement results indicated that Re(550) was 0 nm and Rth(550) was 315 nm. Due to the two kinds of vertical alignment agents, the rod-like liquid crystal molecules were aligned on the patterned alignment film, thereby obtaining a patterned liquid crystal layer in which the rod-like liquid crystal molecules in the exposure areas were vertically aligned (i.e., the tilt angle of the director was 0°) relative to the alignment-film surface.

Example 3

A TN liquid crystal display device was fabricated in a manner similar to that in Example 1 except that the light scattering film A in Example 1 was fabricated as follows.

<<Fabrication of Transparent Support Member C Provided with Patterned Alignment Film>>

The photo-crosslinkable polymer shown below was used. Commercially-available polyvinyl cinnamate (manufactured by Aldrich Chemical Company, Inc.) was precipitated twice by using methanol. Polymethacrylate having cinnamoyl on the side chain thereof was prepared by radically polymerizing an n-propyl-2-(4-methacryloxyphenyl)-ethynyl-carboxylate (M0CinPr) methacrylate monomer. The radical polymerization of this monomer was performed within a 10-percent-by-mass solution based on the following method.

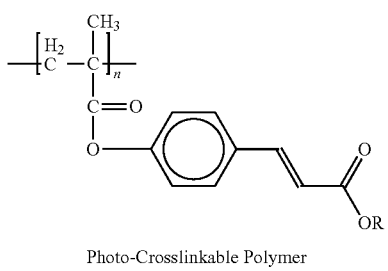

Photo-Crosslinkable Polymer

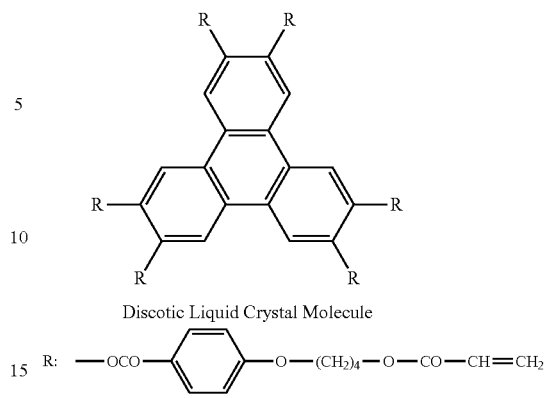

Discotic Liquid Crystal Molecule

R denotes an n-propyl group ($C_3H_8$).

The following were dissolved into 10 mL of dried benzene and were put into an ampule. After repeatedly freezing and thawing these materials, they were degassed.

Monomer: 1.0 g

Polymerization initiator (azobisisobutyronitrile): 10 mg

In order to separate the polymer, the ampule was covered with a lid and was maintained at 60° C. for 10 hours. Subsequently, the obtained solution was poured into methanol so as to induce re-precipitation within the methanol. By repeating this process, the polymer was purified. Finally, the polymer was left to dry at room temperature for six or more hours in vacuum. By using a differential scanning calorimeter (DSC-200 manufactured by Seiko Instruments Inc.), the heat characteristics of the polymer were measured to be a heating rate of ±10° C. per minute.

<<Formation of Patterned Photo-Alignment Film>>

By spin-coating a cellulose triacetate film (TAC-TD80UL manufactured by Fujifilm Corporation) with a 1.5-percent-by-mass solution having a 1:1 mixture of monochlorobenzene and methylene chloride, a thin photo-crosslinkable polymer film having a thickness of about 60 nm was obtained. Then, unpolarized light with a wavelength of 313 nm was radiated diagonally onto the film from a +40° direction relative to the direction of the normal to the transparent support member via a striped mask having 0.8 μm openings at 1.6 μm pitch. Subsequently, after moving the mask by 0.8 μm in a direction orthogonal to the longitudinal direction of the stripes, unpolarized light with a wavelength of 313 nm was radiated diagonally onto the film from a −40° direction relative to the direction of the normal to the transparent support member. The 313-nm light was generated by causing light output from a 150-W Hg—Xe lamp (Supercure-230S manufactured by San-ei Electric Co., Ltd.) to pass through a dissolvable filter, having $K_2CrO_4$ dissolved in NaOH, and a band-pass filter (UV-D35 manufactured by Toshiba Corporation).

<<Formation of Liquid Crystal Layer>>

Subsequently, the light-irradiated thin film was spin-coated with 20 percent by mass of the following polymerizable discotic liquid crystal compound solution dissolved in a 4-methyl-2-pentanone solution containing 0.5 percent by mass of a photo initiator. By heating this, the phase was changed to a discotic nematic phase, and the discotic liquid crystal molecules became aligned. Then, ultraviolet light was radiated so as to induce photo-polymerization of the discotic liquid crystal molecules.

<<Evaluation of Characteristics>>

The light scattering film was cut in a direction orthogonal to the film surface by using a microtome (manufactured by Leica), and the cross-section was observed with a polarizing microscope. When the direction tilted by ±40° relative to the normal to the film surface was aligned with the axis of a cross-Nicol polarization plate of the polarizing microscope, 0.8 μm-wide dark areas with a thickness of about 2.65 μm appeared at 1.6 μm pitch. Consequently, the fabricated liquid crystal layer having liquid crystal molecules aligned in the ±40° direction relative to the direction of the normal to the film surface had a thickness of 2.65 μm and a pitch of 1.6 μm of the liquid crystal molecules.

Example 4

A TN liquid crystal display device was fabricated in a manner similar to that in Example 3 except that the light scattering film in Example 3 was coated with the hard-coat layer fabricated in Example 2.

Example 5

A TN liquid crystal display device was fabricated in a manner similar to that in Example 1 except that the optically anisotropic layer and the transparent support member of the optical compensation film in Example 1 were fabricated as follows, and that the polarization plates and the like were disposed as in the configuration shown in FIG. 12. The light scattering film used was similar to that in Example 3 except that the thickness thereof was changed from 2.65 μm to 1.8 μm.

<Fabrication of Transparent Support Member>

A transparent support member was fabricated in a manner similar to the transparent support member in Example 1 except that, when flow-casting the inner-layer dope and the outer-layer dope onto the drum, which was cooled to 0° C., by using the three-layer co-casting die, the flow rate of the inner-layer dope was reduced to half. The cellulose acetate film had a thickness of 40 μm (i.e., outer layer: 3 μm, inner layer: 34 μm, and outer layer: 3 μm). Re(550) of the fabricated cellulose acetate film was 7 nm, and Rth(550) thereof was 45 nm.

<Fabrication of Optically Anisotropic Layer>

An optically anisotropic layer was fabricated in a manner similar to that in Example 3 except that the discotic liquid crystal solution was reduced to 14 percent by mass.

<<Evaluation of Characteristics>>

The fabricated film was cut in a direction orthogonal to the film surface by using a microtome, and the cross-section was observed with a polarizing microscope. When the direction tilted by ±40° relative to the normal to the film surface was aligned with the axis of the cross-Nicol polarization plate of the polarizing microscope, 0.8 μm-wide dark areas with a thickness of about 1.8 μm appeared at 1.6 μm pitch. Consequently, the fabricated liquid crystal layer having liquid crystal molecules aligned in the ±40° direction relative to the direction of the normal to the film surface had a thickness of 1.8 μm and a pitch of 1.6 μm of the liquid crystal molecules.

Example 6

A TN liquid crystal display device was fabricated in a manner similar to that in Example 1 except that the optically anisotropic layer and the transparent support member of the optical compensation film in Example 1 were fabricated as follows, and that the polarization plates and the like were disposed as in the configuration shown in FIG. 13. The light scattering film used was similar to that in Example 3 except that the thickness thereof was changed from 2.65 μm to 1.8 μm.

<Fabrication of Transparent Support Member>

Cellulose acylate was synthesized based on a method discussed in Japanese Unexamined Patent Applications, Publication No. Hei 10-45804 and Hei 08-231761, and the substitution degree thereof was measured. Specifically, an acylation reaction was performed at 40° C. by adding sulfuric acid (i.e., 7.8 parts by mass relative to 100 parts by mass of cellulose) as a catalyst and also adding carboxylic acid serving as a raw material of an acyl substituent group. In this case, the type and the substitution degree of the acyl group were adjusted by adjusting the type and the amount of the carboxylic acid. After the acylation, aging was performed at 40° C. Moreover, the low-molecular component of this cellulose acylate was removed by using acetone.

<<Preparation of Cellulose Acylate Solution C01>>

A cellulose acetate solution was prepared by injecting the composition shown below into a mixing tank and stirring the composition to dissolve the components. The amounts of solvents (methylene chloride and methanol) were appropriately adjusted so that the concentration of the solid content of the cellulose acetate solution was equal to 22 percent by mass.

Cellulose acetate (substitution degree: 2.45): 100.0 parts by mass
Compound A: 19.0 parts by mass
Methylene chloride: 365.5 parts by mass
Methanol: 54.6 parts by mass <<Preparation of Cellulose Acylate Solution 002>>

Another cellulose acetate solution was prepared by injecting the composition shown below into a mixing tank and stirring the composition to dissolve the components. The amounts of solvents (methylene chloride and methanol) were appropriately adjusted so that the concentration of the solid content of the cellulose acetate solution was equal to 22 percent by mass.

Cellulose acetate (substitution degree: 2.81): 100.0 parts by mass
Compound A: 12.0 parts by mass
Methylene chloride: 365.5 parts by mass
Methanol: 54.6 parts by mass The compound A indicated a copolymer of terephthalic acid, succinic acid, ethylene glycol, and propylene glycol (copolymerization ratio (molar percentage)=27.5/22.5/25/25), and the extremity of the compound was sealed by an acetyl group.

By using a band stretching device, flow casting was performed on the cellulose acylate solution C01 and the cellulose acylate solution C02 so that they became a 56 μm thick core layer and a 2 μm thick skin-A layer, respectively. Subsequently, the obtained web (film) was separated from the band, was held with a clip, and was stretched sideways by using a tenter. The stretching temperature was set to 172° C., and the stretching percentage was set to 30%. Then, the clip was removed from the film, and the film was dried at 130° C. for 20 minutes, thereby obtaining the resultant film.

The in-plane retardation Re of the fabricated transparent support member at a wavelength of 550 nm was 50 nm, and the retardation Rth in the thickness direction was 120 nm.

<Fabrication of Optically Anisotropic Layer>

The coating solution shown below was continuously applied onto the alignment film surface by using a #3.0 wire bar. The solvent was dried by being heated continuously from room temperature to 100° C. Subsequently, the solvent was heated for about 90 seconds in a 135° C. drying zone, thereby aligning the discotic liquid crystal molecules. Then, the solvent was conveyed to a drying zone in which the drying temperature is 80° C. Once the surface temperature of the film was about 100° C., the solvent was irradiated with ultraviolet light with an intensity of 600 mW from an ultraviolet emitting device for 10 seconds so as to induce a crosslinking reaction, whereby the discotic liquid crystal compound was polymerized. Subsequently, the solvent was left to cool to room temperature so as to form an optically anisotropic layer, whereby an optical compensation film was fabricated.

(Composition of Optically Anisotropic Layer Coating Solution)

Methyl ethyl ketone: 333.39 parts by mass
Aforementioned discotic liquid crystal compound (I): 91.00 parts by mass
Ethylene-oxide modified trimethylolpropane triacrylate (V#360 manufactured by Osaka Organic Chemical Industry Ltd.): 9.00 parts by mass
Air interface alignment control agent shown below: 0.75 parts by mass
Photo-polymerization initiator (IRGACURE 907 manufactured by Ciba-Geigy K.K.): 3.00 parts by mass
Sensitizer (Kayacure DETX manufactured by Nippon Kayaku Co., Ltd): 1.00 part by mass

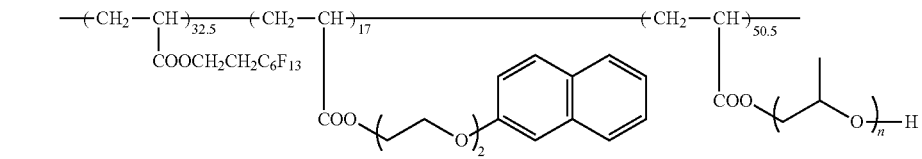

Air Interface Alignment Control Agent n = 6

Example 7

A TN liquid crystal display device was fabricated in a manner similar to that in Example 1 except that the optically anisotropic layer and the transparent support member of the optical compensation film in Example 1 were fabricated as follows and that the polarization plates and the like were disposed as in the configuration shown in FIG. 14. The light scattering film used was similar to that in Example 3 except that the thickness thereof was changed from 2.65 μm to 1.8 μm.

<Fabrication of Transparent Support Member>

A transparent support member was fabricated in a manner similar to the transparent support member in Example 1 except that, when flow-casting the inner-layer dope and the outer-layer dope onto the drum, which was cooled to 0° C., by using the three-layer co-casting die, the flow rate of the inner-layer dope was reduced to half. In addition, an alignment film was formed. The fabricated transparent support member had a cellulose acetate film (with a thickness of 40 μm (i.e., outer layer: 3 μm, inner layer: 34 μm, and outer layer: 3 μm)). The in-plane retardation Re of the fabricated cellulose acetate film at a wavelength of 550 nm was 7 nm, and the retardation Rth in the thickness direction was 45 nm.

<Formation of Alignment Film>

The alignment film was formed over the fabricated transparent support member in a manner similar to that in Example 1.

<Fabrication of Optically Anisotropic Layer A>

A coating solution containing a rod-like liquid crystal compound with the composition shown below was continuously applied onto the alignment film surface by using a #2.2 wire bar. For drying the solvent after the application and for aligning and aging the rod-like liquid crystal molecules, the coating solution was heated for 60 seconds with warm air at a temperature of 90° C. Then, the alignment state of the liquid crystal molecules was fixed by irradiating them with ultraviolet light, whereby an optically anisotropic layer A was fabricated.

(Composition of Coating Solution for Optically Anisotropic Layer A)

Rod-like liquid crystal compound shown below: 100 parts by mass
Photo-polymerization initiator shown below: 3 parts by mass
Sensitizer (Kayacure DETX manufactured by Nippon Kayaku Co., Ltd): 1 part by mass
Fluorine-based polymer (D) shown below: 0.4 parts by mass
Horizontal alignment agent shown below: 0.2 parts by mass
Methyl ethyl ketone: 195 parts by mass

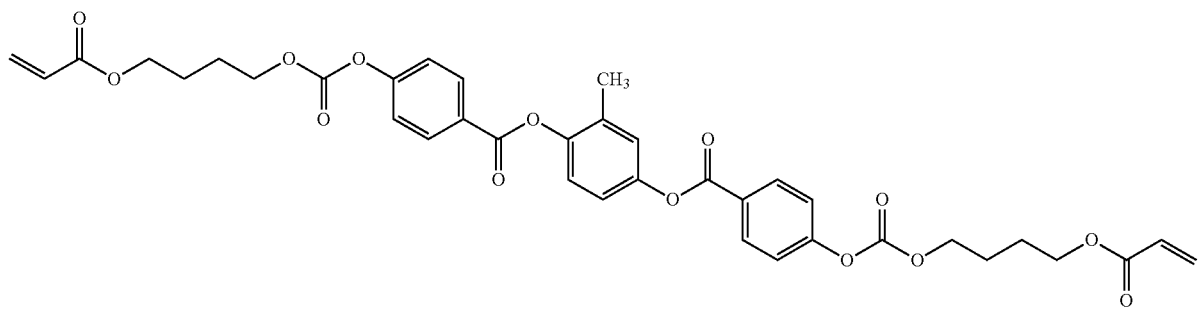

Rod-like Liquid Crystal Compound

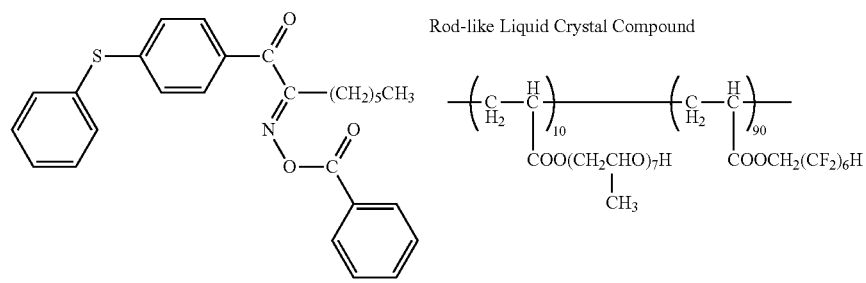

Photo-Polymerization Initiator

Fluorine-Based Polymer (D)

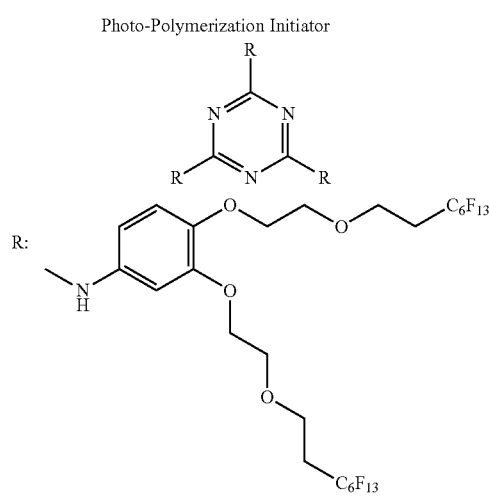

Horizontal Alignment Agent

The in-plane retardation of the optically anisotropic layer at a wavelength of 550 nm, Re(550), was measured by using a method similar to that in Example 1. Furthermore, in a plane orthogonal to the slow axis of the optically anisotropic layer, the retardation R[+40°] and retardation R[−40°] were measured by radiating light with a wavelength of 550 nm from a direction tilted by ±40 degrees from the direction of the normal, and R[−40°]/R[+40°] was calculated. Re(550) was measured to be 51 nm, and R[−40°]/R[+40°] was calculated to be 11.

<Formation of Alignment Film and Optically Anisotropic Layer B>

An alignment film was formed over the fabricated optically anisotropic layer in a manner similar to that in Example 1, and an optically anisotropic layer coating solution similar to that in Example 6 was applied thereon, so that an optically anisotropic layer was fabricated based on a procedure similar to that in Example 6.

Example 8

A TN liquid crystal display device was fabricated in a manner similar to that in Example 1 except that the transparent support member of the optical compensation film in Example 1 was fabricated as follows and that the polarization plates and the like were disposed as in the configuration shown in FIG. 11. The light scattering film used was similar to that in Example 3 except that the thickness thereof was changed from 2.65 μm to 1.8 μm.

<Fabrication of Transparent Support Member>
<<Preparation of Cellulose Ester Solution A>>

A cellulose ester solution 1-A was prepared by injecting the composition shown below into a mixing tank and stirring the composition while heating it to dissolve the components. The acetyl substitution degree was measured in accordance with ASTM D-817-91. The viscosity-average degree of polymerization was measured based on the intrinsic viscosity method of Uda et al. (Uda, Kazuo and Saito, Hideo, Journal of the Society of Fiber Science and Technology, Vol. 18, No. 1, pp. 105-120 (1962)).

(Composition of Cellulose Ester Solution A)
Cellulose ester (cellulose acetate with acetyl substitution degree of 2.86): 100 parts by mass
Sugar ester 1: 5.5 parts by mass
Sugar ester 2: 1.5 parts by mass
Methylene chloride: 365.8 parts by mass
Methanol: 92.6 parts by mass
Butanol: 4.6 parts by mass The sugar esters 1 and 2 are compounds or mixtures having the structures shown below. The average ester substitution degree of the sugar ester 1, which is sucrose benzoate, was measured based on the following method.

Based on measurement under high-performance liquid chromatography (HPLC) conditions, a peak group with a retention time around 31.5 minutes is defined as an 8-substituted derivative, a peak group with a retention time around 27 to 29 minutes is defined as a 7-substituted derivative, a peak group with a retention time around 22 to 25 minutes is defined as a 6-substituted derivative, a peak group with a retention time around 15 to 20 minutes is defined as a 5-substituted derivative, a peak group with a retention time around 8.5 to 13 minutes is defined as a 4-substituted derivative, a peak group with a retention time around 3 to 6 minutes is defined as a 3-substituted derivative, and the average substitution degree relative to the total value of the area ratios thereof was calculated.

<<HPLC Measurement Conditions>>
Column: TSK-gel ODS-100Z (by Tosoh Corporation), 4.6*150 mm, lot number (P0014)
Eluting Solution A: $H_2O$=100, and Eluting Solution B: AR=100 (Both A and B having 0.1% of each of AcOH and $NEt_3$)
Flow Rate: 1 ml/min
Column Temperature: 40° C.
Wavelength: 254 nm
Sensitivity: AUX2
Injection Amount: 10 μl
Rinsing Liquid: $THF/H_2O$=9/1 (volume ratio)
Sample Concentration: 5 mg/10 ml (THF)

Although the average ester substitution degree can be similarly measured for the sugar ester 2, the sugar ester 2 shown below is a single compound with an ester substitution degree of substantially 100%.

With regard to the sucrose benzoate used in all of the examples, a 100-ppm-or-lower sucrose benzoate that has been dried under reduced pressure (10 mmHg or lower) by using toluene, which is a reaction solvent, was used.

Sugar Ester 1: Average Ester Substitution Rate of 71%

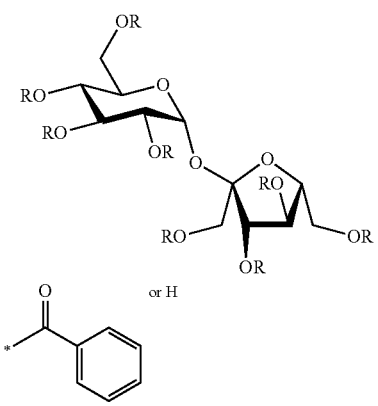

Sugar Ester 2: Average Ester Substitution Rate of 100% (Single Compound)

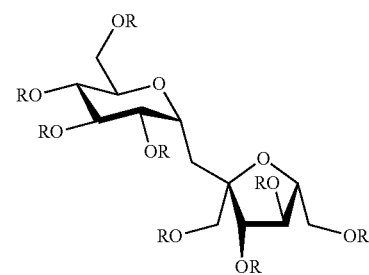

R=Acetyl group/i-butyryl group (2/6)
<<Preparation of Matting-Agent Dispersant B>>

A matting-agent dispersant 1-B was prepared by injecting the composition shown below into a dispersing device and stirring the composition to dissolve the components.
(Composition of Matting-Agent Dispersant B)
Silica particles with average particle size of 16 nm (AEROSIL R972 manufactured by Nippon Aerosil Co., Ltd.): 10.0 parts by mass
Methylene chloride: 72.8 parts by mass
Methanol: 3.9 parts by mass Butanol: 0.5 parts by mass
Cellulose ester solution A: 10.3 parts by mass <<Preparation of Ultraviolet Absorbent Solution C-1>>

An ultraviolet absorbent solution C-1 was prepared by injecting the composition shown below into another mixing tank and stirring the composition while heating it to dissolve the components.

(Composition of Ultraviolet Absorbent Solution C-1)
Ultraviolet absorbent (referred to as "UV-1" hereinafter): 10.0 parts by mass
Ultraviolet absorbent (referred to as "UV-2" hereinafter): 10.0 parts by mass
Methylene chloride: 55.7 parts by mass
Methanol: 10 parts by mass
Butanol: 1.3 parts by mass
Cellulose ester solution A: 12.9 parts by mass

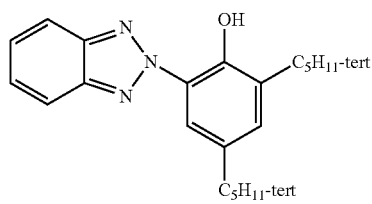
(UV-1)

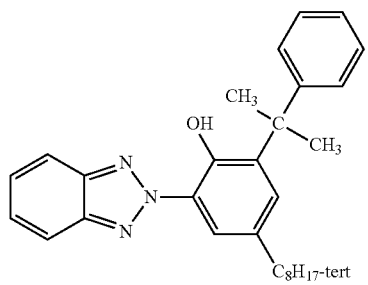
(UV-2)

<<Preparation of Ultraviolet Absorbent Solution C-2>>

An ultraviolet absorbent solution C-2 was prepared by injecting the composition shown below into another mixing tank and stirring the composition while heating it to dissolve the components.

(Composition of Ultraviolet Absorbent Solution C-2)
Ultraviolet absorbent (the aforementioned UV-2): 10.0 parts by mass
Methylene chloride: 55.7 parts by mass
Methanol: 10 parts by mass
Butanol: 1.3 parts by mass
Cellulose ester solution A: 12.9 parts by mass <Fabrication of Cellulose Ester Film>

The matting-agent dispersant B was added to the cellulose ester solution A such that the sugar ester 1 was 5.5 parts by mass and the sugar ester 2 was 1.5 parts by mass per 100 parts by mass of cellulose ester. The ultraviolet absorbent solution C-1 or C-2 was added to the obtained solution such that the ultraviolet absorbent (UV-1) and the ultraviolet absorbent (UV-2) were each equal to 1.0 percent by mass. The solutions were sufficiently stirred while being heated to dissolve the components, whereby a dope was prepared. The obtained dope was heated to 30° C. and was flow-casted onto a 3 m diameter mirror-finished stainless-steel support member serving as a drum via a flow-casting coating device. The surface temperature of the support member was set to −5° C., and the coating width was set to 1470 mm. The ambient temperature of the entire flow-cast area was set to 15° C. Then, the flow-casted cellulose ester film rotated to a point located 50 cm before the terminal point of the flow-cast area was removed from the drum, and opposite edges of the film were clipped by using a pin tenter. The amount of solvent remaining in the cellulose ester web immediately after it was removed was 70%, and the film-surface temperature of the cellulose ester web was 5° C.

The cellulose ester web held by the pin tenter was conveyed to a drying zone. In a first drying process, 45° C. drying air was blown onto the cellulose ester web. Then, the cellulose ester web was dried for 5 minutes at 110° C., and was further dried for 10 minutes at 140° C. The film thickness of the fabricated cellulose ester film was 40 μm.

After immersing the fabricated cellulose ester film in a 2.0N potassium hydroxide solution (25° C.) for two minutes, the cellulose ester film was neutralized with sulfuric acid. Then, after washing the cellulose ester film with purified water, the cellulose ester film was dried.

Comparative Example 1

A TN liquid crystal display device was fabricated in a manner similar to that in Example 3 except that the film thickness of the light scattering film in Example 3 was changed from 2.65 μm to 1.8 μm.

Comparative Example 2

A TN liquid crystal display device was fabricated in a manner similar to that in Example 1 except that a light scattering cell fabricated by referring to paragraphs [0040] to [0042] in Japanese Unexamined Patent Application, Publication No. 2006-201388 was used in place of the light scattering film.

Comparative Example 3

A TN liquid crystal display device was fabricated in a manner similar to that in Example 3 except that the transparent support member of the light scattering film in Example 3 was fabricated as follows.

<Fabrication of Transparent Support Member Provided with Patterned Alignment Film>

A transparent support member provided with a patterned alignment film was fabricated in a manner similar to that in Example 5 except that, in the fabrication process of the transparent support member provided with the patterned alignment film in Example 3, a mask having 0.15 μm openings at 0.3 μm pitch was used as the striped mask, and after using the mask once, the mask was moved by 0.15 μm in the direction orthogonal to the longitudinal direction of the stripes.

<<Evaluation of Characteristics>>

The obtained film was cut in a direction orthogonal to the film surface by using a microtome, and the cross-section was observed with a polarizing microscope. When the direction tilted by ±40° relative to the normal to the film surface was aligned with the axis of a cross-Nicol polarization plate of the polarizing microscope, 0.15 μm-wide dark areas with a thickness of about 1.8 μm appeared at 0.3 μm pitch. Consequently, the fabricated liquid crystal layer having discotic liquid crystal molecules aligned in the ±40° direction relative to the direction of the normal to the film surface had a thickness of 1.8 μm and a pitch of 0.3 μm of the liquid crystal molecules.

Comparative Example 4

A TN liquid crystal display device was fabricated in a manner similar to that in Example 3 except that the transparent support member of the light scattering film in Example 3 was fabricated as follows.
<Fabrication of Transparent Support Member Provided with Patterned Alignment Film>
A transparent support member provided with a patterned alignment film was fabricated in a manner similar to that in Example 5 except that a mask having 2 μm openings at 4 μm pitch was used as the striped mask, and after using the mask once, the mask was moved by 2 μm in the direction orthogonal to the longitudinal direction of the stripes.
<<Evaluation of Characteristics>>
The obtained film was cut in a direction orthogonal to the film surface by using a microtome, and the cross-section was observed with a polarizing microscope. When the direction tilted by ±40° relative to the normal to the film surface was aligned with the axis of a cross-Nicol polarization plate of the polarizing microscope, 2 μm-wide dark areas with a thickness of about 1.8 μm appeared at 4 μm pitch. Consequently, the fabricated liquid crystal layer having discotic liquid crystal molecules aligned in the ±40° direction relative to the direction of the normal to the film surface had a thickness of 1.8 μm and a pitch of 4 μm of the liquid crystal molecules.

Comparative Example 5

A TN liquid crystal display device was fabricated in a manner similar to that in Example 3 except that the transparent support member of the light scattering film in Example 3 was fabricated as follows.
<Fabrication of Transparent Support Member Provided with Patterned Alignment Film>
A transparent support member provided with a patterned alignment film was fabricated in a manner similar to that in Example 5 except that unpolarized light with a wavelength of 313 nm was radiated diagonally thereto from the ±1° direction relative to the direction of the normal to the transparent support member.
<<Evaluation of Characteristics>>
The obtained film was cut in a direction orthogonal to the film surface by using a microtome, and the cross-section was observed with a polarizing microscope. When the direction tilted by ±1° relative to the normal to the film surface was aligned with the axis of a cross-Nicol polarization plate of the polarizing microscope, 0.8 μm-wide dark areas with a thickness of about 1.8 μm appeared at 1.6 μm pitch. Consequently, the fabricated liquid crystal layer having discotic liquid crystal molecules aligned in the ±1° direction relative to the direction of the normal to the film surface had a thickness of 1.8 μm and a pitch of 1.6 μm of the liquid crystal molecules.

Comparative Example 6

A TN liquid crystal display device was fabricated in a manner similar to that in Example 3 except that the transparent support member of the light scattering film in Example 3 was fabricated as follows.
<Fabrication of Transparent Support Member Provided with Patterned Alignment Film>
A transparent support member provided with a patterned alignment film was fabricated in a manner similar to that in Example 5 except that unpolarized light with a wavelength of 313 nm was radiated diagonally thereto from the ±65° direction relative to the direction of the normal to the transparent support member.
<<Evaluation of Characteristics>>
The obtained film was cut in a direction orthogonal to the film surface by using a microtome, and the cross-section was observed with a polarizing microscope. When the direction tilted by ±65° relative to the normal to the film surface was aligned with the axis of a cross-Nicol polarization plate of the polarizing microscope, 0.8 μm-wide dark areas with a thickness of about 1.8 μm appeared at 1.6 μm pitch. Consequently, the fabricated liquid crystal layer having discotic liquid crystal molecules aligned in the ±65° direction relative to the direction of the normal to the film surface had a thickness of 1.8 μm and a pitch of 1.6 μm of the liquid crystal molecules.

Comparative Example 7

A TN liquid crystal display device was fabricated in a manner similar to that in Example 1 except that the liquid crystal layer and the transparent support member of the light scattering film in Example 1 were fabricated as follows.
<Fabrication of Transparent Support Member E Provided with Patterned Alignment Film>
A transparent support member E provided with a patterned alignment film was fabricated in a manner similar to that in Example 1 except that the patterned-alignment-film composition in Example 1 was changed to that shown below and that a stripe mask whose transmitting areas have a stripe width of 1.6 μm and whose blocking areas have a stripe width of 1.6 μm was used.
(Composition of Patterned Alignment Film)
Polymer material (PVA-103, polyvinyl alcohol manufactured by Kuraray Co., Ltd.): 2.4 parts by mass
Methanol: 16.7 parts by mass
Isopropanol: 7.5 parts by mass
Water: 73.4 parts by mass
<Fabrication of Patterned Liquid Crystal Layer E>
A patterned liquid crystal layer E was fabricated in a manner similar to that in Example 1 except that the optically anisotropic layer composition in Example 1 was changed to that shown below.
(Liquid Crystal Layer Composition)
Rod-like liquid crystal compound (LC-242 manufactured by BASF Corporation): 100 parts by mass
Vertical alignment agent A: 0.5 parts by mass Photo-polymerization initiator (IRGACURE 907 manufactured by BASF Corporation): 3.3 parts by mass
Sensitizer (Kayacure DETX manufactured by Nippon Kayaku Co., Ltd): 1.1 parts by mass
Methyl ethyl ketone: 1300 parts by mass
<<Evaluation of Shapes>>

The shapes of exposure areas and non-exposure areas of the formed patterned liquid crystal layer were analyzed by using VertScan2.0 (manufactured by Ryoka Systems Inc.). As a result, the exposure areas had a thickness of 0.08 μm and were arranged at 1.6 μm pitch, whereas the non-exposure areas had a thickness of 0.07 μm and were arranged at 1.6 μm pitch.
<<Evaluation of Optical Performance>>

Next, in accordance with the above-described method using KOBRA-21ADH (manufactured by Oji Scientific Instruments), the alignment state of the rod-like liquid crystal molecules, the directions of the slow axes, and Re and Rth were measured. In the first phase-difference areas (i.e., the exposure areas), Re(550) was 0 nm and Rth(550) was 40 nm. In the second phase-difference areas (i.e., the non-exposure areas), Re(550) was 0 nm and Rth(550) was 35 nm. Due to the vertical alignment agent, the rod-like liquid crystal molecules were aligned on the patterned alignment film, thereby obtaining a patterned liquid crystal layer in which the rod-like liquid crystal molecules were vertically aligned (i.e., the tilt angle of the director is) 0° relative to the alignment-film surface.

Comparative Example 8

A TN liquid crystal display device was fabricated in a manner similar to that in Example 1 except that the liquid crystal layer of the light scattering film in Example 1 was fabricated as follows.
<Fabrication of Patterned Liquid Crystal Layer>

A patterned liquid crystal layer was fabricated in a manner similar to that in Example 1 except that the liquid-crystal-layer composition was changed to that shown below, the bar was changed to a #24 bar, and the thickness was changed.
(Liquid-Crystal-Layer Composition)
Rod-like liquid crystal compound A: 100 parts by mass
Vertical alignment agent A: 0.5 parts by mass
Vertical alignment agent B: 1.0 parts by mass
Photo-polymerization initiator (IRGACURE 907 manufactured by BASF Corporation): 3.3 parts by mass
Sensitizer (Kayacure DETX manufactured by Nippon Kayaku Co., Ltd): 1.1 parts by mass
Methyl ethyl ketone: 300 parts by mass <<Evaluation of Shapes>>

The shapes of exposure areas and non-exposure areas of the formed patterned liquid crystal layer were analyzed by using VertScan2.0 (manufactured by Ryoka Systems Inc.). As a result, the exposure areas had a thickness of 15 μm and were arranged at 1.6 μm pitch, whereas the non-exposure areas had a thickness of substantially 0 μm.
<<Evaluation of Optical Performance>>

Next, in accordance with the above-described method using KOBRA-21ADH (manufactured by Oji Scientific Instruments), the alignment state of the rod-like liquid crystal molecules, the directions of the slow axes, and Re and Rth were measured. The measurement results indicated that Re(550) was 0 nm and Rth(550) was 750 nm. Due to the two kinds of vertical alignment agents, the rod-like liquid crystal molecules were aligned on the patterned alignment film, thereby obtaining a patterned liquid crystal layer in which the rod-like liquid crystal molecules in the first phase-difference areas (i.e., the exposure areas) were vertically aligned (i.e., the tilt angle of the director is 0°) relative to the alignment-film surface.
[Evaluation of Liquid Crystal Display Device]
<Grayscale Inversion>

Grayscale inversion in an image (Image Name: Portrait, Standard No. JIS X 9201:1995, ISO 12640-1:1997) displayed on each of the fabricated liquid crystal display devices described above was evaluated by visually observing the displayed image from a downward direction (polar angle of 30°) in a dark room.

Level 5: There is practically no problem since grayscale inversion as viewed from a downward direction is hardly noticeable.

Level 4: There is practically no problem since grayscale inversion as viewed from a downward direction is mostly unnoticeable.

Level 3: There is practically no problem since only a small degree of grayscale inversion occurs as viewed from a downward direction.

Level 2: There is practically no problem although grayscale inversion occurs as viewed from a downward direction.

Level 1: There is a practical problem since a large degree of grayscale inversion occurs as viewed from a downward direction.
<Evaluation of Front Contrast (Front CR)>

With regard to each of the fabricated liquid crystal display devices described above, the brightness in the forward direction (i.e., the direction of the normal to the display surface) in a black display (L0) and a white display (L7) was measured by using the measuring device "EZ-Contrast XL88" (manufactured by ELDIM S.A.), and a contrast ratio (white brightness/black brightness) was calculated. Each liquid crystal display device was evaluated based on the following criteria.

A: Front CR is higher than or equal to 1200

B: Front CR is higher than or equal to 1000 but lower than 1200

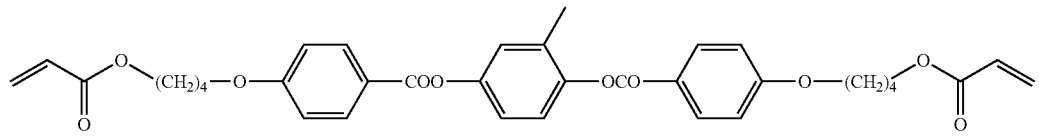

Compound A

Rod-like Liquid Crystal

C: Front CR is higher than or equal to 800 but lower than 1000

D: Front CR is lower than 800

TABLE 1

| | | | Example 1 | Example 2 | Example 3 | Example 4 | Example 5 | Example 6 | Example 7 | Example 8 |
|---|---|---|---|---|---|---|---|---|---|---|
| Layer structure | Existance or non-existance of hard-coat layer | | non-existance | Existance | non-existance | Existance | non-existance | non-existance | non-existance | non-existance |
| | Light scattering film | Scattering area ratio | 78 | 1060 | 1060 | 1060 | 1060 | 1060 | 1060 | 1060 |
| | | Material Types of liquid crystal | Rod-like | Rod-like | DLC | DLC | DLC | DLC | DLC | DLC |
| | | ne | 1.593 | 1.593 | 1.543 | 1.543 | 1.543 | 1.543 | 1.543 | 1.543 |
| | | no | 1.491 | 1.491 | 1.604 | 1.604 | 1.604 | 1.604 | 1.604 | 1.604 |
| | | Tilt angle of the director | 0° | 0° | 40° | 40° | 40° | 40° | 40° | 40° |
| | | Thickness (μm) | 0.17 | 6.3 | 2.65 | 2.65 | 1.8 | 1.8 | 1.8 | 1.8 |
| | | Pitch (μm) | 1.6 | 1.6 | 1.6 | 1.6 | 1.6 | 1.6 | 1.6 | 1.6 |
| | Polarizer 1 | Absorption axis | 45 | 45 | 45 | 45 | 90 | 90 | 90 | 45 |
| | Optically compensation film 1 | Support 1 Slow axis | 45 | 45 | 45 | 45 | 90 | 45 | 90 | 45 |
| | | Re/Rth | 7/90 | 7/90 | 7/90 | 7/90 | 7/45 | 50/120 | 7/45 | 1/38 |
| | | Optical anisotropic layer A Rod-like liquid crystal horizontal alignment layer Slow axis | — | — | — | — | — | — | 45 | — |
| | | Re(550) | — | — | — | — | — | — | 51 | — |
| | | Optical anisotropic layer 1 Slow axis | 135 | 135 | 135 | 135 | 135 | 135 | 135 | 135 |
| | | Re1(550) | 49 | 49 | 49 | 49 | 13 | 25 | 25 | 49 |
| | | R[−40]/R[+40] | 4.2 | 4.2 | 4.2 | 4.2 | 16.1 | 11 | 11 | 4.2 |
| | | Sum of Re of optical anisotoropic layer A and Re of optical anisotropic layer | — | — | — | — | — | — | −26 | — |
| | Liquid crystal cell | Rubbing direction (Side of adjoining the polarizing plate) | 45 | 45 | 45 | 45 | 45 | 45 | 45 | 45 |
| | Optically compensation film 2 | Support 2 Slow axis | 135 | 135 | 135 | 135 | 0 | 135 | 0 | 135 |
| | | Re/Rth | 7/90 | 7/90 | 7/90 | 7/90 | 7/45 | 50/120 | 7/45 | 1/38 |
| | | Optical anisotropic layer B Rod-like liquid crystal horizontal alignment layer Slow axis | — | — | — | — | — | — | 135 | — |
| | | Re(550) | — | — | — | — | — | — | 51 | — |
| | | Optical anisotropic layer 2 Slow axis | 45 | 45 | 45 | 45 | 45 | 45 | 45 | 45 |
| | | Re2(550) | 49 | 49 | 49 | 49 | 13 | 25 | 25 | 49 |
| | | R[−40]/R[+40] | 4.2 | 4.2 | 4.2 | 4.2 | 16.1 | 11 | 11 | 4.2 |
| | | Sum of Re of optical anisotoropic layer A and Re of optical anisotropic layer | — | — | — | — | — | — | −26 | — |
| | Polarizer 2 | Absorption axis | 135 | 135 | 135 | 135 | 0 | 0 | 0 | 135 |
| | Fig. No. | | 11 | 11 | 11 | 11 | 12 | 13 | 14 | 11 |
| Display performance | Evaluation | Downward grayscale inversion | 3 | 4 | 4 | 4 | 5 | 5 | 5 | 5 |
| | | Front CR | C | B | B | B | A | A | A | A |

TABLE 2

| | | | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|---|
| Layer structure | Existance or non-existance of hard-coat layer | | non-existance | non-existance | non-existance | non-existance | non-existance | non-existance | non-existance | non-existance |
| | Light scattering film | Scattering area ratio | 35 | 20 | 0 | 1 | 0 | 0 | 0 | 0 |
| | | Material Types of liquid crystal | DLC | Rod-like | DLC | DLC | DLC | DLC | Rod-like | Rod-like |
| | | ne | 1.543 | 1.593 | 1.543 | 1.543 | 1.543 | 1.543 | 1.593 | 1.593 |
| | | no | 1.604 | 1.491 | 1.604 | 1.604 | 1.604 | 1.604 | 1.491 | 1.491 |
| | | Tilt angle of the director | 40° | 0° | 40° | 40° | 1° | 89° | 0° | 0° |

TABLE 2-continued

|  |  |  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|---|
|  |  | Thickness (μm) | 1.8 | 0 | 1.8 | 1.8 | 1.8 | 1.8 | 0.01 | 15 |
|  |  | Pitch (μm) | 1.6 | 2 | 0.3 | 4 | 1.6 | 1.6 | 1.6 | 1.6 |
| First Polarizer |  | Absorption axis | 45 | 45 | 45 | 45 | 45 | 45 | 45 | 45 |
| Optically compensation film 1 | Support 1 | Slow axis | 45 | 45 | 45 | 45 | 45 | 45 | 45 | 45 |
|  |  | Re/Rth | 7/90 | 7/90 | 7/90 | 7/90 | 7/90 | 7/90 | 7/90 | 7/90 |
|  | Optical anisotropic layer A Rod-like liquid crystal horizontal alignment layer | Slow axis | — | — | — | — | — | — | — | — |
|  |  | Re(550) | — | — | — | — | — | — | — | — |
|  | Optical anisotropic layer 1 | Slow axis | 135 | 135 | 135 | 135 | 135 | 135 | 135 | 135 |
|  |  | Re1(550) | 49 | 49 | 49 | 49 | 49 | 49 | 49 | 49 |
|  |  | R[−40]/R[+40] | 4.2 | 4.2 | 4.2 | 4.2 | 4.2 | 4.2 | 4.2 | 4.2 |
|  | Sum of Re of optical anisotoropic layer A and Re of optical anisotropic layer |  | — | — | — | — | — | — | — | — |
| Liquid crystal cell |  | Rubbing direction (Side of adjoining the polarizing plate) | 45 | 45 | 45 | 45 | 45 | 45 | 45 | 45 |
| Optically compensation film 2 | Support 2 | Slow axis | 135 | 135 | 135 | 135 | 135 | 135 | 135 | 135 |
|  |  | Re/Rth | 7/90 | 7/90 | 7/90 | 7/90 | 7/90 | 7/90 | 7/90 | 7/90 |
|  | Optical anisotropic layer B Rod-like liquid crystal horizontal alignment layer | Slow axis | — | — | — | — | — | — | — | — |
|  |  | Re(550) | — | — | — | — | — | — | — | — |
|  | Optical anisotropic layer 2 | Slow axis | 45 | 45 | 45 | 45 | 45 | 45 | 45 | 45 |
|  |  | Re2(550) | 49 | 49 | 49 | 49 | 49 | 49 | 49 | 49 |
|  |  | R[−40]/R[+40] | 4.2 | 4.2 | 4.2 | 4.2 | 4.2 | 4.2 | 4.2 | 4.2 |
|  | Sum of Re of optical anisotoropic layer A and Re of optical anisotropic layer |  | — | — | — | — | — | — | — | — |
| Second Polarizer |  | Absorption axis | 135 | 135 | 135 | 135 | 135 | 135 | 135 | 135 |
|  | Fig. No. |  | 11 | 11 | 11 | 11 | 11 | 11 | 11 | 11 |
| Display performance | Evaluation | Downward grayscale inversion | 2 | 2 | 1 | 2 | 1 | 1 | 1 | 3 |
|  |  | Front CR | C | D | B | D | B | B | B | D |

It is apparent from these tables that downward grayscale inversion is suppressed and front contrast is improved in each of the above examples in which the liquid crystal layer of the light scattering film has a repeating pattern in which the pitch of the liquid crystal compound ranges between 0.35 μm and 3 μm and that is oriented at 45° relative to the liquid-crystal director direction of the liquid crystal display device, the liquid crystal layer has a thickness ranging between 0.17 μm and 10 μm, and the weighted scattering area ratio of the goniophotometer scattering profile of the light scattering film satisfies a predetermined expression.

The present disclosure relates to the subject matter contained in Japanese Patent Application No. 287974/2012 filed on Dec. 28, 2012, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystal display device comprising:
   first and second polarizers disposed such that absorption axes thereof are orthogonal to each other;
   first and second substrates that are disposed facing each other between the first and second polarizers and at least one of which has a transparent electrode; and
   a twisted-nematic liquid crystal cell disposed between the first and second substrates,
   wherein a light scattering film is provided at a viewing side of the first and second polarizers and includes a support member and a liquid crystal layer composed of a liquid crystal compound applied over the support member, wherein the liquid crystal layer has a repeating pattern in which the pitch of the liquid crystal compound ranges between 0.35 μm and 3 μm and that is oriented at 45° relative to a liquid-crystal director direction of the liquid crystal display device, wherein the liquid crystal layer has a thickness ranging between 0.17 μm and 10 μm, and wherein a weighted scattering area ratio of a goniophotometer scattering profile of the light scattering film satisfies the following expression:

$$S_{60}/(S_0)^2 \times 1000 > 40$$

where $S_0$ and $S_{60}$ are values defined based on the following expressions:

$$S_0 = \frac{\sum S_0(\theta) \times \theta}{\sum S_0(\theta)}$$

where $S_0(\theta)$ denotes a value obtained by irradiating a film surface of the light scattering film with light in a direction of the normal thereto and measuring a light intensity of scattered light from a polar angle θ° relative to the direction of the normal to the film surface of the light scattering film, and $$S_{60} = \frac{\sum S_{60}(\theta) \times \exp(-0.2 \times \theta)}{\sum S_{60}(\theta)}$$

where $S_{60}(\theta)$ denotes a value obtained by irradiating the film surface of the light scattering film with light in a 60° direction relative thereto and measuring a light intensity of scattered light from a polar angle θ° relative to the direction of the normal to the film surface of the light scattering film.

2. The liquid crystal display device according to claim 1, wherein the pitch of the liquid crystal compound ranges between 1.0 μm and 2.5 μm.

3. The liquid crystal display device according to claim 1, wherein the thickness of the liquid crystal layer ranges between 1.0 μm and 2.5 μm.

4. The liquid crystal display device according to claim 1, wherein the liquid crystal compound included in the liquid crystal layer is a discotic liquid crystal compound, wherein a director of the discotic liquid crystal compound is tilted at an angle θ ranging between ±30° and ±60°, wherein absolute values of tilt angles are the same, and wherein alignment patterns with different positive and negative angle values repeat in an alternating manner.

5. The liquid crystal display device according to claim 1, wherein the liquid crystal compound included in the liquid crystal layer is a rod-like liquid crystal compound, and wherein a director of the rod-like liquid crystal compound is oriented within ±10° relative to the direction of the normal to the film surface of the light scattering film.

6. The liquid crystal display device according to claim 5, wherein a hard-coat layer is formed on the surface of the light scattering film.

7. The liquid crystal display device according to claim 1, wherein the liquid crystal display device is of a birefringent type.

8. The liquid crystal display device according to claim 1, further comprising polarizer protection films provided at liquid-crystal-cell sides of the first and second polarizers, wherein each protection film has an optically anisotropic layer including a support member and a discotic liquid crystal compound fixed in a hybrid alignment state on the support member.

9. The liquid crystal display device according to claim 2, wherein the thickness of the liquid crystal layer ranges between 1.0 μm and 2.5 μm.

10. The liquid crystal display device according to claim 2, wherein the liquid crystal compound included in the liquid crystal layer is a discotic liquid crystal compound, wherein a director of the discotic liquid crystal compound is tilted at an angle θ ranging between ±30° and ±60°, wherein absolute values of tilt angles are the same, and wherein alignment patterns with different positive and negative angle values repeat in an alternating manner.

11. The liquid crystal display device according to claim 2, wherein the liquid crystal compound included in the liquid crystal layer is a rod-like liquid crystal compound, and wherein a director of the rod-like liquid crystal compound is oriented within ±10° relative to the direction of the normal to the film surface of the light scattering film.

12. The liquid crystal display device according to claim 2, wherein the liquid crystal display device is of a birefringent type.

13. The liquid crystal display device according to claim 2, further comprising polarizer protection films provided at liquid-crystal-cell sides of the first and second polarizers, wherein each protection film has an optically anisotropic layer including a support member and a discotic liquid crystal compound fixed in a hybrid alignment state on the support member.

14. The liquid crystal display device according to claim 3, wherein the liquid crystal compound included in the liquid crystal layer is a discotic liquid crystal compound, wherein a director of the discotic liquid crystal compound is tilted at an angle θ ranging between ±30° and ±60°, wherein absolute values of tilt angles are the same, and wherein alignment patterns with different positive and negative angle values repeat in an alternating manner.

15. The liquid crystal display device according to claim 3, wherein the liquid crystal compound included in the liquid crystal layer is a rod-like liquid crystal compound, and wherein a director of the rod-like liquid crystal compound is oriented within ±10° relative to the direction of the normal to the film surface of the light scattering film.

16. The liquid crystal display device according to claim 3, wherein the liquid crystal display device is of a birefringent type.

17. The liquid crystal display device according to claim 3, further comprising polarizer protection films provided at liquid-crystal-cell sides of the first and second polarizers, wherein each protection film has an optically anisotropic layer including a support member and a discotic liquid crystal compound fixed in a hybrid alignment state on the support member.

18. The liquid crystal display device according to claim 4, wherein the liquid crystal compound included in the liquid crystal layer is a rod-like liquid crystal compound, and wherein a director of the rod-like liquid crystal compound is oriented within ±10° relative to the direction of the normal to the film surface of the light scattering film.

19. The liquid crystal display device according to claim 4, wherein the liquid crystal display device is of a birefringent type.

20. A light scattering film comprising:
a support member; and
a liquid crystal layer composed of a liquid crystal compound applied over the support member,
wherein the liquid crystal layer has a repeating pattern in which the pitch of the liquid crystal compound ranges between 0.35 μm and 3 μm and that is formed in one direction at a film surface, wherein the liquid crystal layer has a thickness ranging between 0.17 μm and 10 μm, and wherein a weighted scattering area ratio of a goniophotometer scattering profile of the light scattering film satisfies the following expression:

$$S_{60}/(S_0)^2 \times 1000 > 40$$

where $S_0$ and $S_{60}$ are values defined based on the following expressions:

$$S_0 = \frac{\sum S_0(\theta) \times \theta}{\sum S_0(\theta)}$$

where $S_0(\theta)$ denotes a value obtained by irradiating the film surface of the light scattering film with light in a direction of the normal thereto and measuring a light intensity of scattered light from a polar angle $\theta°$ relative to the direction of the normal to the film surface of the light scattering film, and $$S_{60} = \frac{\sum S_{60}(\theta) \times \exp(-0.2 \times \theta)}{\sum S_{60}(\theta)}$$

where $S_{60}(\theta)$ denotes a value obtained by irradiating the film surface of the light scattering film with light in a 60° direction relative thereto and measuring a light intensity of scattered light from a polar angle $\theta°$ relative to the direction of the normal to the film surface of the light scattering film.

* * * * *